(12) United States Patent
Kornerup et al.

(10) Patent No.: US 8,204,951 B2
(45) Date of Patent: *Jun. 19, 2012

(54) DETERMINISTIC COMMUNICATION BETWEEN GRAPHICAL PROGRAMS EXECUTING ON DIFFERENT COMPUTER SYSTEMS USING VARIABLE NODES

(75) Inventors: Jacob Kornerup, Austin, TX (US); Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,076

(22) Filed: Nov. 9, 2010

(65) Prior Publication Data

US 2011/0138008 A1      Jun. 9, 2011

Related U.S. Application Data

(63) Continuation of application No. 11/206,249, filed on Aug. 17, 2005, now Pat. No. 7,831,680, which is a continuation-in-part of application No. 11/204,779, filed on Aug. 16, 2005, now Pat. No. 7,565,609, and a continuation-in-part of application No. 10/892,829, filed on Jul. 16, 2004, now Pat. No. 7,574,690.

(60) Provisional application No. 60/601,948, filed on Aug. 16, 2004.

(51) Int. Cl.
*G06F 15/167* (2006.01)
*G06F 15/16* (2006.01)

(52) U.S. Cl. ......... 709/212; 709/201; 709/217; 709/205

(58) Field of Classification Search .................. 709/201, 709/205, 212, 213, 216
See application file for complete search history.

(56) References Cited

U.S. PATENT DOCUMENTS

| 4,901,221 A | 2/1990 | Kodosky et al. |
| 5,093,780 A * | 3/1992 | Sunahara ...................... 709/213 |
| 5,283,861 A | 2/1994 | Dangler et al. |
| 5,475,851 A | 12/1995 | Kodosky et al. |

(Continued)

OTHER PUBLICATIONS

Deitel, "Operating Systems," Second Edition, 1990, 2 pages, Addison-Wesley, USA.

(Continued)

*Primary Examiner* — John Follansbee
*Assistant Examiner* — Madhu Woolcock
(74) *Attorney, Agent, or Firm* — Meyertons Hood Kivlin Kowert & Goetzel, P.C.; Jeffrey C. Hood; Mark S. Williams

(57) ABSTRACT

A system and method for enabling deterministic or time-triggered data exchange between a first graphical program and a second graphical program. A first variable is assigned to a first time slot in a network cycle. A first graphical program may be configured to write data to the first variable. A second graphical program may be configured to read data from the first variable. The first graphical program may be executed on a first computer system, where executing the first graphical program comprises writing data to the first variable. Writing data to the first variable may cause the data to be delivered over a network to a second computer system when the first time slot occurs. The second graphical program may be executed on the second computer system, where executing the second graphical program comprises reading from the first variable the data sent from the first computer system.

17 Claims, 30 Drawing Sheets

U.S. PATENT DOCUMENTS

| | | | |
|---|---|---|---|
| 5,481,741 A | | 1/1996 | McKaskle et al. |
| 5,513,324 A | * | 4/1996 | Dolin et al. ............. 709/237 |
| 5,551,041 A | | 8/1996 | Beethe |
| 5,564,049 A | * | 10/1996 | Schmidt .......................... 1/1 |
| 5,732,277 A | | 3/1998 | Kodosky et al. |
| 5,737,622 A | | 4/1998 | Rogers et al. |
| 5,933,598 A | * | 8/1999 | Scales et al. ............. 709/216 |
| 5,949,412 A | | 9/1999 | Huntsman |
| 5,956,028 A | * | 9/1999 | Matsui et al. ............. 715/757 |
| 5,971,581 A | | 10/1999 | Gretta et al. |
| 6,073,139 A | | 6/2000 | Jain et al. |
| 6,128,699 A | * | 10/2000 | Golding ..................... 711/112 |
| 6,141,022 A | | 10/2000 | Anfossi et al. |
| 6,141,596 A | | 10/2000 | Gretta et al. |
| 6,151,020 A | | 11/2000 | Palmer et al. |
| 6,173,438 B1 | | 1/2001 | Kodosky et al. |
| 6,243,765 B1 | * | 6/2001 | Raab et al. ................ 719/316 |
| 6,370,159 B1 | | 4/2002 | Eidson |
| 6,584,601 B1 | | 6/2003 | Kodosky et al. |
| 6,654,356 B1 | | 11/2003 | Eidson et al. |
| 6,732,067 B1 | | 5/2004 | Powderly |
| 6,802,053 B1 | | 10/2004 | Dye et al. |
| 6,826,600 B1 | | 11/2004 | Russell |
| 6,836,852 B2 | | 12/2004 | Wang et al. |
| 6,854,111 B1 | * | 2/2005 | Havner et al. ............. 717/163 |
| 6,883,142 B2 | | 4/2005 | Shimamoto et al. |
| 6,934,668 B2 | | 8/2005 | Kodosky et al. |
| 6,961,686 B2 | | 11/2005 | Kodosky et al. |
| 6,971,084 B2 | | 11/2005 | Grey et al. |
| 7,043,693 B2 | | 5/2006 | Wenzel et al. |
| 7,055,130 B2 | * | 5/2006 | Charisius et al. ........... 717/108 |
| 7,069,305 B2 | * | 6/2006 | Serizawa et al. ........... 709/213 |
| 7,093,249 B2 | | 8/2006 | Melamed et al. |
| 7,114,091 B2 | | 9/2006 | Vrancic |
| 7,174,536 B1 | * | 2/2007 | Kothari et al. ............. 717/109 |
| 7,380,086 B2 | * | 5/2008 | Archambault et al. ........ 711/170 |
| 7,411,937 B2 | | 8/2008 | Guilford |
| 7,593,944 B2 | * | 9/2009 | Rogers et al. ............... 1/1 |
| 7,802,263 B2 | * | 9/2010 | Fuchs et al. ............... 719/314 |
| 2002/0070966 A1 | * | 6/2002 | Austin ....................... 345/763 |
| 2002/0089538 A1 | * | 7/2002 | Wenzel et al. ............. 345/763 |
| 2002/0122062 A1 | | 9/2002 | Melamed et al. |
| 2003/0035009 A1 | | 2/2003 | Kodosky et al. |
| 2003/0132964 A1 | * | 7/2003 | Santori et al. ............. 345/763 |
| 2003/0196187 A1 | | 10/2003 | Kodosky et al. |
| 2004/0032412 A1 | | 2/2004 | Odom |
| 2004/0201627 A1 | | 10/2004 | Maddocks et al. |
| 2005/0086318 A1 | | 4/2005 | Aubault |
| 2005/0283780 A1 | * | 12/2005 | Karp et al. ................. 718/100 |

OTHER PUBLICATIONS

Communication pursuant to Article 96(2) EPC, Application No. 04 757 092.4-1243, Jul. 2, 2007; 7 pages.

Gao, et al., "A Timed Petri-Net Model for Fine-Grain Loop Schedulin", ACM SIGPLAN 1991 Conference, Jun. 26-28, 1991; 15 pages.

Liu, et al., "Heterogenous Modeling and Design of Control Systems", IEEE Control System Magazine, Oct. 27, 2001; 33 pages.

Naef, Emil, "Hard Real-Time and Synchronous Programming with SDL," ISSN 0280-5316, Department of Automatic Control, Lund Institute of Technology, Apr. 2001; 53 pages.

Thiele, et al., "FunState—An Internal Design Representation for Codesign", 0-7803-5832-5/99, 1999 IEEE, May 1999; 8 pages.

"Simulink Model-Based and System-Based Design", Using Simulink, Version 5, 1990; 484 pages.

"LabVIEW User Manual", National Instruments, Part No. 320999E-01, Apr. 2003 Edition; 352 pages.

Garcia, G., "Advanced Application Timing Presentation Overview", Retrieved from Internet: <ftp://ftp.ni.com/pub/devzone/advanced_application_timing_with_labview_real_time>, 38 pages, retrieved Mar. 28, 2006.

"While Loops", Retrieved from Internet: <http://www.elis.ugent.be/elisgroups/tfcg/student/Ivu6373.pdf>, Mar. 15, 2000, pp. 3.4-3.14.

International Search Report and Written Opinion of the International Searching Authority for Application No. PCT/US2004/023000 mailed Apr. 7, 2006; 12 pages "Timing a LabVIEW Operation", Technical Note 022, Oct. 1992, 3 pages, National Instruments Corporation.

H. Kopetz and G. Grunsteidl; "TTP—A Time-Triggered Protocol for Fault-Tolerant Real-Time Systems"; Institut fur Technische Informatik, Technische Universitat Wien; 1993; 10 pages.

International Search Report and Written Opinion of Application No. PCT/US2005/029436 mailed Mar. 30, 2006. 12 pages.

"LabVIEW Real-Time Module User Manual"; Apr. 2004 Edition; National Instruments Corporation; 72 pages.

Matthew Gast; "T1: A Survival Guide"; printed from the website: <www.oreilly.com/catalog/t1survival/chapter/ch05.html>; Aug. 2001; 9 pages.

Office Action of Feb. 21, 2008, in U.S. Appl. No. 10/892,829, 41 pages.

Final Office Action of Sep. 23, 2008, in U.S. Appl. No. 10/892,829, 17 pages.

* cited by examiner

Include a first graphical code portion in a first graphical program, where the first graphical program is to be executed on a first device
281

Configure the first graphical program to execute the first graphical code portion for a plurality of iterations, where the iterations of the first graphical code portion are timed based on a clock of a second device
283

Execute the first graphical program on the first device
285

Iterations of the first graphical code portion are timed based on the clock of the second device
287

FIG. 9

Include a first graphical code portion in a first graphical program, where the first graphical program is to be executed on a first device
291

Configure the first graphical program to execute the first graphical code portion for a plurality of iterations, where the iterations of the first graphical code portion are timed based on events originating from a second device
293

Execute the first graphical program on the first device
295

Iterations of the first graphical code portion are timed based on events originating from the second device
297

FIG. 11

DETERMINISTIC COMMUNICATION BETWEEN GRAPHICAL PROGRAMS EXECUTING ON DIFFERENT COMPUTER SYSTEMS USING VARIABLE NODES

PRIORITY CLAIM

This application is a continuation of U.S. patent application Ser. No. 11/206,249 titled "Deterministic Communication between Graphical Programs Executing on Different Computer Systems," filed Aug. 17, 2005 now U.S. Pat. No. 7,831,680, whose inventors were Jacob Kornerup and Aljosa Vrancic, which is a continuation-in-part of U.S. patent application Ser. No. 11/204,779 titled "Synchronizing Execution of Graphical Programs Executing on Different Computer Systems" and filed on Aug. 16, 2005 now U.S. Pat. No. 7,565,609, whose inventors were Aljosa Vrancic and Jacob Kornerup, which claims benefit of priority of U.S. provisional application Ser. No. 60/601,948 titled "Graphical Programming System with Deterministic Communication," filed Aug. 16, 2004, whose inventors were Aljosa Vrancic and Jacob Kornerup, and which are all hereby incorporated by reference in their entirety as though fully and completely set forth herein.

U.S. patent application Ser. No. 11/206,249 is also a continuation-in-part of U.S. patent application Ser. No. 10/892,829 titled "A Graphical Program Which Executes a Timed Loop," filed Jul. 16, 2004 now U.S. Pat. No. 7,574,690, whose inventors were Biren Shah, Jacob Kornerup, Aljosa Vrancic, Jeffrey L. Kodosky and Michael L. Santori, and which is hereby incorporated by reference in its entirety as though fully and completely set forth herein.

FIELD OF THE INVENTION

The present invention relates to the field of graphical programming, and more particularly to a system and method for synchronizing execution of a graphical program executing on one computer system with a graphical program executing on another computer system, or with operation of another device, such as a measurement device.

DESCRIPTION OF THE RELATED ART

Traditionally, high level text-based programming languages have been used by programmers in writing application programs. Many different high level text-based programming languages exist, including BASIC, C, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Graphical programs may also be used in distributed applications. Many distributed applications require different graphical programs executing on different computer systems to exchange data with each other. In some cases the data exchange may be performed repetitively in a loop. For certain applications it can be important that the data arrives at each graphical program in a deterministic fashion, i.e., according to a known period and with little or no jitter. For example, in a real-time distributed control application, communication of data between distributed real-time computing nodes is an integral part of the control loop. It may be important for the data communication to occur deterministically in order to avoid jitter in the control loop. As another example, a hardware-in-the-loop (HIL) simulation that has to run in real-time may be distributed across multiple nodes that exchange data with each other. Again, it may be important for the data communication to occur deterministically to ensure that time steps of the simulation model can be computed at the desired rate.

SUMMARY OF THE INVENTION

One embodiment of the invention comprises a system and method for enabling data exchange between a first graphical program and a second graphical program. According to one embodiment of the method, a first variable may be assigned to a first time slot in a network cycle. A first graphical program may be configured to write data to the first variable. A second graphical program may be configured to read data from the first variable.

The first graphical program may be executed on a first computer system, where executing the first graphical program comprises writing data to the first variable. Writing data to the first variable may cause the data to be delivered over a network to a second computer system when the first time slot occurs.

The second graphical program may be executed on the second computer system, where executing the second graphical program comprises reading from the first variable the data sent from the first computer system.

BRIEF DESCRIPTION OF THE DRAWINGS

A better understanding of the present invention can be obtained when the following detailed description of the preferred embodiment is considered in conjunction with the following drawings, in which:

FIG. 9 is a flowchart diagram illustrating one embodiment of a method for synchronizing execution of a graphical program executing on one device with a graphical program executing on another device and/or with operation of another device;

FIG. 11 is a flowchart diagram illustrating another embodiment of a method for synchronizing execution of a graphical program executing on one device with a graphical program executing on another device and/or with operation of another device;

FIGS. 22-27 illustrate an exemplary configuration tool allowing a user to create and configure various objects for a closed network, also referred to herein as a time-triggered network;

Figure 1:
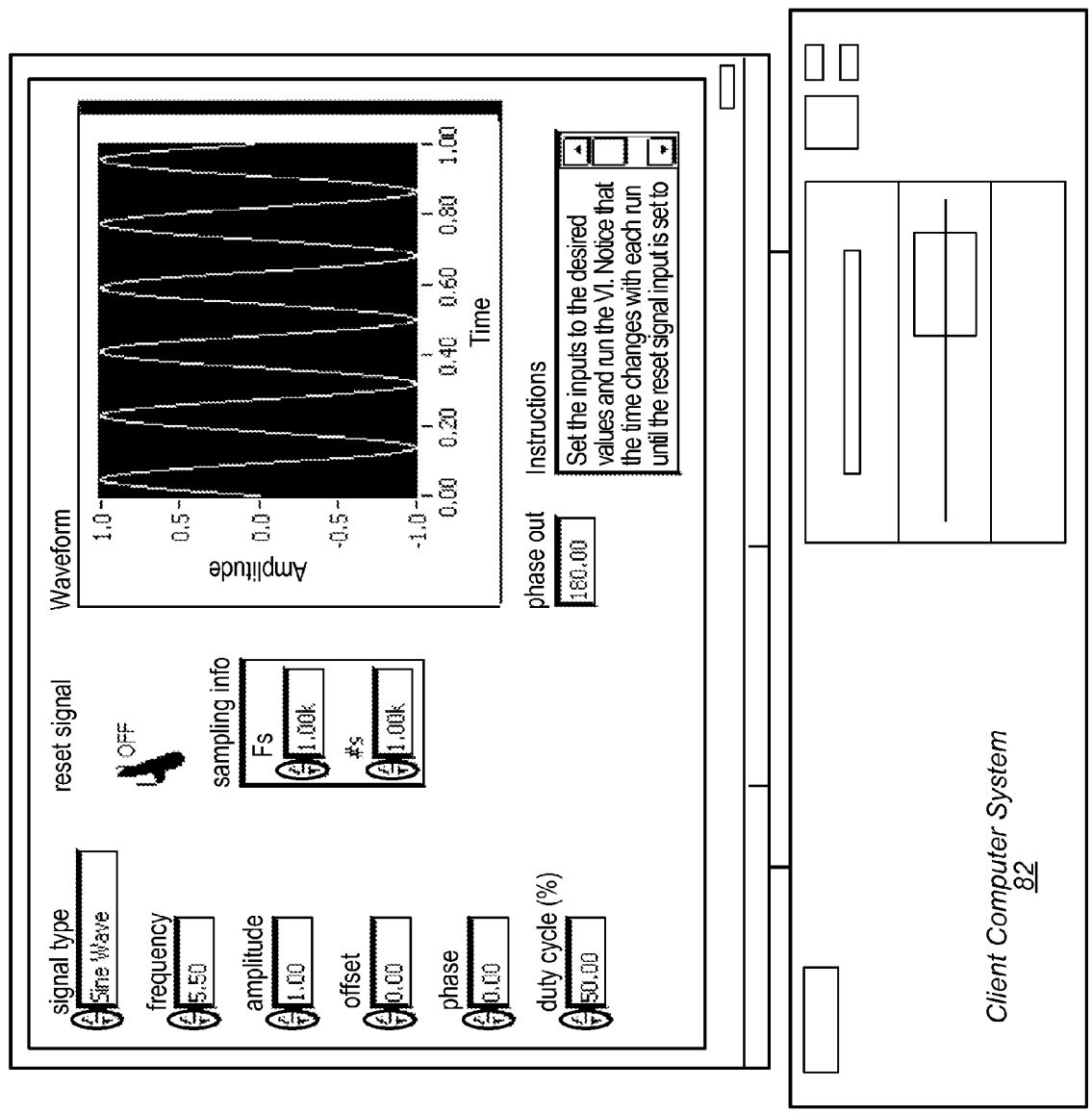
FIG. 1 illustrates an exemplary computer system operable to execute a graphical program.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 6,173,438 titled "Embedded Graphical Programming System",

U.S. Patent Application Publication No. 20010020291 (Ser. No. 09/745,023) titled "System and Method for Programmatically Generating a Graphical Program in Response to Program Information," filed Dec. 20, 2000.

U.S. Patent Application Publication No. 20030184596 titled "Configuration diagram which displays a configuration of a system" filed Oct. 2, 2003.

U.S. patent application Ser. No. 09/976,726 titled, "System and Method for Enabling a Graphical Program to Respond to User Interface Events," filed Oct. 12, 2001.

U.S. patent application Ser. No. 10/892,829 titled, "A Graphical Program Which Executes a Timed Loop", filed Jul. 16, 2004.

U.S. patent application Ser. No. 11/204,286 titled, "Timed Sequence Structure for a Graphical Program", filed Aug. 15, 2005.

U.S. patent application Ser. No. 11/203,816 titled, "Combination Structure Nodes for a Graphical Program," filed Aug. 15, 2005.

U.S. provisional application Ser. No. 60/601,948 titled "Graphical Programming System with Deterministic Communication," filed Aug. 16, 2004.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1—Computer System

Referring now to FIG. 1, a computer system 82 operable to execute a graphical program is illustrated. The graphical program may be configured to perform a loop that executes a graphical code portion (i.e., one or more graphical program nodes) for a plurality of iterations. In various embodiments the loop may be implemented in any of various ways. In one embodiment, the graphical program may include a timed loop structure that drives execution of the graphical code portion based on a timing source. For example, the user may include a timed loop structure node or icon in the graphical program and associate the graphical code portion with the timed loop structure node, to cause the graphical code portion to be executed at each iteration of the loop. In various embodiments the graphical code portion may be associated with the timed loop structure node in various ways. In one embodiment, the timed loop structure node may have an inner portion, e.g., delineated by a border, and the graphical code portion may be associated with the timed loop structure node by placing it inside the inner portion, e.g., inside the border.

The user may also configure the timed loop with timing information. In one embodiment the timing information may include an execution period which specifies a desired period at which the timed loop should execute during execution of the graphical program. In one embodiment the execution period controls the time at which execution begins for each iteration of the timed loop. For example, if the execution period is 100 ms, then iteration N of the timed loop may begin at time T, iteration N+1 may begin at time T+100 ms, iteration N+2 may begin at time T+200 ms, etc.

In one embodiment the execution period for the timed loop may be based on a particular timing source. The user may specify a timing source to associate with the timed loop, where the timing source comprises an entity useable as a source of timing and scheduling for the timed loop. The timing of the timed loop may be based on a periodic signal or pulse provided by the timing source. In one embodiment, the units for the execution period of the timed loop may be based on the timing source. For example, the user may simply specify a period of "100", without specifying a time unit. This may signify that a new iteration of the timed loop should begin at every 100th tick or pulse of the timing source. For a 1 kHz timing source, this may correspond to a period of 100 ms. For a 1 MHz timing source, this may correspond to a period of 100 µs. In another embodiment, the user may specify both a number of ticks and the desired units, e.g., may directly specify a period of 100 ms.

In various embodiments, the timed loop may be configured with any kind of timing source. One example of a timing source that may be used to control timing of the timed loop is a 1 kHz system clock provided by a PC computer system, such as the computer system 82 discussed above. Another example is the 1 MHz timer of RIO hardware boards from National Instruments Corp. In another embodiment the timing source may be based on internal countdown registers of the processor of the computer system that executes the graphical program. For example, in one embodiment countdown registers of a Pentium processor may be utilized as a 1 MHz timing source. In other embodiments, any of various other kinds of timing sources may be utilized. Examples of other timing sources include analog input/analog output (AI/AO), counter (CTR), and digital IO (DIO) ports on DAQ or other hardware boards.

In one embodiment, the ticks or pulses of a timing source may not occur at regular intervals in time. Thus, the timing of loop iterations may be controlled relative to ticks or pulses of the timing source, but the iterations may or may not occur at regular intervals in time. For example, in one embodiment the timing of the iterations of the timed loop may be based on an event, where the event may or may not be generated at regular intervals in time. For example, in one embodiment, configuring the timed loop with timing information may comprise associating one or more events with the timed loop. When an event associated with the timed loop is generated during execution of the graphical program, an iteration of the timed loop may occur in response. In other words, the graphical code portion associated with the timed loop may execute each time one of the associated events is generated. Thus, in this embodiment, the generation of an event associated with the timed loop may constitute a tick or pulse of the timing source for the timed loop. For some applications, it may be desirable to base the timing of a process performed by the graphical program on the generation of an event in this manner, e.g., to configure the graphical program to perform an action or process each time a particular event is generated.

In one embodiment the timed loop may be configured to iterate in response to each occurrence of the event(s) associated with the timed loop, i.e., a new iteration of the timed loop may begin each time the associated event is generated. In another embodiment, the timed loop may be configured to iterate only after the event has been generated a certain number of times. For example, where an event A has been associated with or specified as the timing source for the timed loop, the user may specify an execution period of 50 to signify that a new iteration of the timed loop should begin every 50th time the event A is generated.

In various embodiments, any kinds of events may be associated with or specified as the timing source for the timed loop, including software-generated or software-based events and/or hardware-generated or hardware-based events. In one embodiment, one or more events associated with or generated by hardware devices may be associated with the timed loop. Thus, the timed loop may iterate in response to an event being generated by a hardware device during execution of the graphical program. As one example, the graphical program may perform a measurement function and may include a timed loop configured to iterate in response to each instance of an event generated by a data acquisition device or other measurement device. Other examples of events that may be associated with the timed loop include interrupts, system events, timer events, etc.

Another example of a timing source that may be used to control timing of the timed loop is a network timing source. For example, in one embodiment the network timing source may comprises a clock that provides a master time to all the nodes, e.g., computer systems and other devices, connected to the network. Thus, in one embodiment the network timing source may utilize this master time as the basis for controlling timing of the timed loop.

In another embodiment the network timing source may be operable to generate ticks based on network events other than time. For example, the network timing source may be operable to cause the timed loop to iterate in response to various types of network events which may or may not occur at regular time intervals. For example, the timed loop may be configured to wake up or iterate in response to a packet arrival event being generated, where the packet arrival event indicates that a network packet has been received. As other examples, the timed loop may be configured to iterate in response to a buffer full event, where the buffer full event indicates that a network buffer is full, or the timed loop may be configured to iterate in response to other kinds of buffer-based events, such as a buffer empty event or a buffer half-full event. Other exemplary types of network events that may drive execution of a timed loop in a graphical program are described below.

In one embodiment, the events associated with the timed loop may be events that are internal to the graphical program or internal to a graphical programming development environment with which the graphical program is associated. For example, the events may include a user interface event associated with a native user interface control on the graphical program's user interface. In another embodiment, one or more events that are external to the graphical program or external to the graphical programming development environment may be associated with the timed loop. For example, events such as ActiveX events or .NET events may be associated with the timed loop. As another example, DAQ events or events generated by hardware devices, or network events, may be associated with the timed loop, as noted above.

Thus, in various embodiments the user may associate any kind of timing source with the timed loop for acting as a trigger for iterations of the timed loop, where the timing source may or may not cause iterations of the loop to occur at regular time intervals.

In one embodiment the timed loop may also be configured with an offset. The offset may specify the amount of time (or the number of ticks or events generated by the timing source) by which to delay the execution of the first iteration of the timed loop. Units for the offset may be based on the timing source, similarly as described above. For example, if the user specifies an offset of 30 and a period of 100, and if the timing source for the timed loop is a 1 KHz clock, then the first iteration of the timed loop may begin executing at time T=30 ms, and subsequent iterations may begin executing at times of 130 ms, 230 ms, 330 ms, etc.

The timed loop may also be configured with any of various other kinds of timing information, such as a priority, a timeout value, etc. For more information on one embodiment of a timed loop structure for use in a graphical program, please refer to the above-incorporated patent application titled, "A Graphical Program Which Executes a Timed Loop".

Referring again to FIG. 1, in one embodiment the computer system 82 may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store a graphical program configured to execute a timed loop in sync with a timed loop executing in another graphical program on another computer system. Also, the memory medium may store a graphical programming development environment application used to create the graphical program and/or an execution subsystem used to execute the graphical program. The memory medium may also store network communication software enabling a timed loop in a graphical program to execute in sync with remote graphical programs or remote devices. The memory medium may also store operating system software, as well as other software for operation of the computer system.

Figure 2:
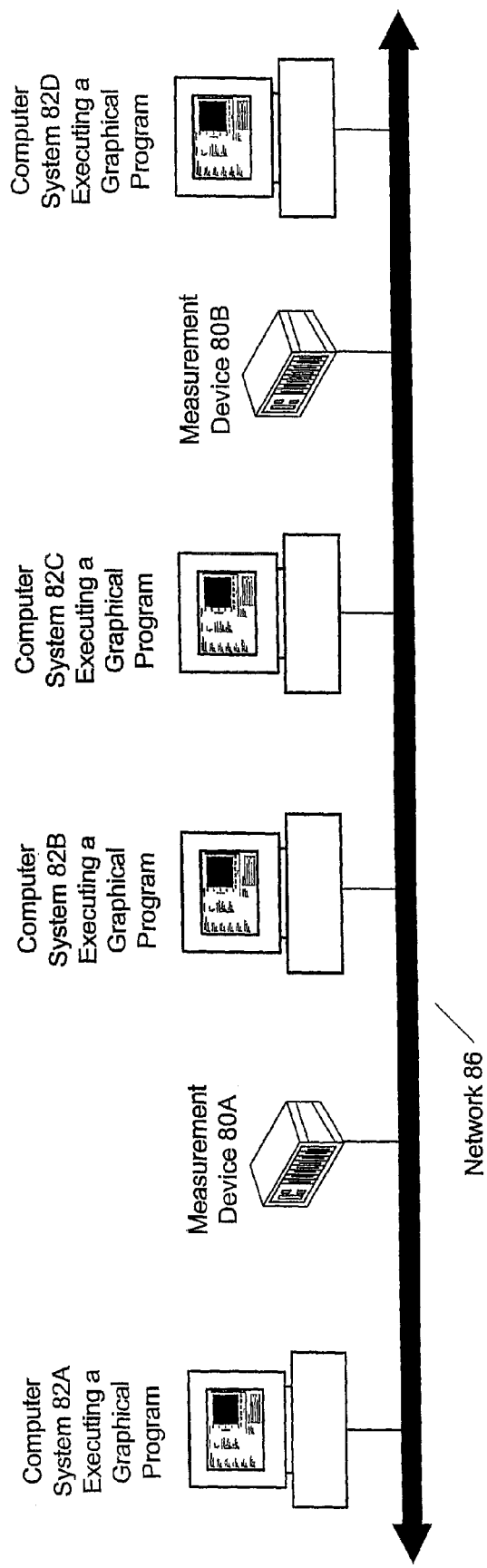
FIG. 2 illustrates an exemplary system including a plurality of computer systems and measurement devices coupled to a network.

FIG. 2 illustrates an exemplary system including a plurality of computer systems 82 and measurement devices 80 coupled to a network 86. In various embodiments, the computer systems 82 may include any of various kinds of computer systems, and the measurement devices 80 may include any of various kinds of measurement devices. In other embodiments, any of various other kinds of devices may be coupled to the network 86. Devices coupled to the network 86 are also referred to herein as nodes or network nodes.

The devices on the network may operate together to perform various operations. In one embodiment, one or more of the computer systems 82, measurement devices 80, or other devices may operate together to perform a measurement function, process control function, industrial automation function, simulation function, or any of various other kinds of applications.

The network 86 may comprise one or more networks of any kind, including a LAN (local area network), WAN (wide area network), the Internet, or an Intranet, among others. As described below, in one embodiment the network 86 may include a deterministic network.

In one embodiment the computer systems 82, measurement devices 80, or other devices coupled to the network 86 may perform a function requiring operation of two or more of the computer systems or devices to be synchronized. For example, execution of a graphical program on one computer system 82 may need to be synchronized with execution of a graphical program on another computer system 82 or may need to be synchronized with operation of a measurement device 80. As one example, two graphical programs executing on different computer systems may need to exchange data with each other in a synchronized fashion.

It is noted that graphical programs may executed on devices coupled to the network 86 other than computer systems 82. As one example, a hardware device comprising an FPGA device or other programmable hardware element may be coupled to the network 86, and a graphical program may execute on the FPGA or other programmable hardware element.

Figure 3:
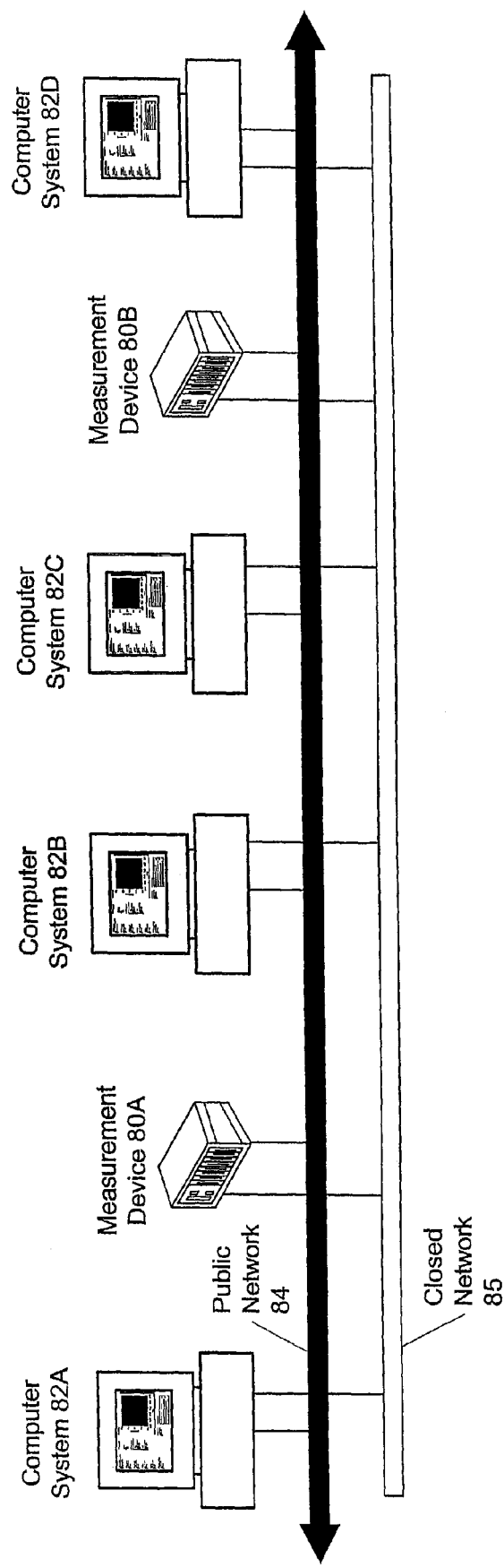
FIG. 3 illustrates another exemplary system including a plurality of computer systems and measurement devices coupled to two networks, referred to as a public network and a closed network.

FIG. 3 illustrates another exemplary system including a plurality of computer systems 82 and measurement devices 80. In this embodiment, each device is coupled to two networks, referred to as a public network 84 and a closed network 85. In one embodiment the closed network 85 may comprise a network in which messages are scheduled. The public network 84 may comprise a non-scheduled network, such as a regular Ethernet network. Devices coupled to the public network 84 and closed network 85 are also referred to herein as nodes or network nodes.

Scheduling messages on the closed network 85 may guarantee that no network collisions occur. This may allow the closed network 85 to support deterministic communication. For example, when a message is sent, the message may be guaranteed to arrive at the destination node within a certain pre-defined amount of time (unless the message is lost). Thus, devices on the closed network 85 may cooperate so that communication over the closed network 85 is scheduled such that it is known when messages will arrive.

Figure 4:
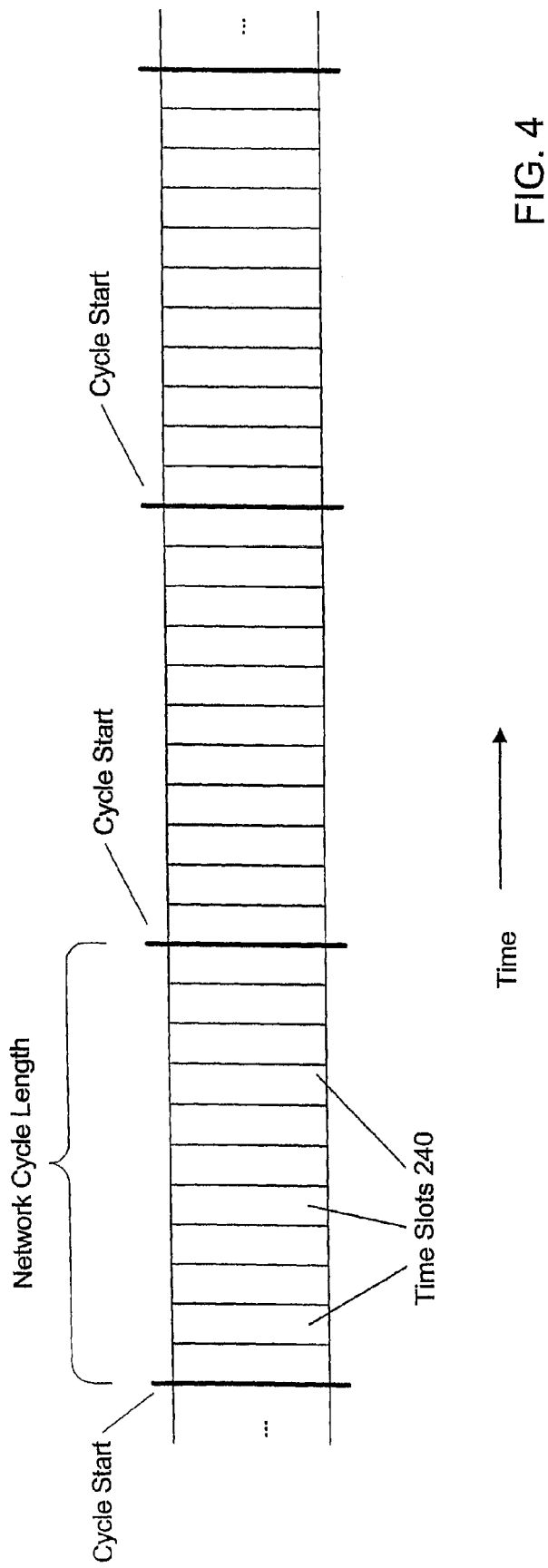
FIG. 4 illustrates network bandwidth organized into cycles with respect to time.

In one embodiment, messages on the closed network 85 may be scheduled according to a network time cycle. For example, as illustrated in FIG. 4, the network bandwidth may be organized into cycles with respect to time. As used herein, the terms network cycle and cycle may refer to a cyclically recurring time period associated with a network. In one embodiment, one of the nodes (e.g., computer systems) coupled to the closed network 85 may act as a master node that sends a cycle start packet on the network to signify the beginning of each cycle. For example, in FIG. 4, three adjacent cycles are shown, where the beginning of each cycle is marked.

In one embodiment the master node may have a clock that is used as a master clock for all the nodes on the network 85. For example, the master node may transmit its time to the other nodes on the network, and the other nodes may synchronize their local clocks with the master time. This may allow the nodes on the network 85 to utilize a common time, referred to herein as the network time, to synchronize their activities. In one embodiment the time on the master node may be periodically transmitted so that the other nodes on the network 85 can re-synchronize their clocks to the clock of the master node. In one embodiment the time on the master node is transmitted at the beginning of each cycle.

Each cycle may comprise a plurality of time slots 240. As used herein, a time slot refers to a time during a cycle when a message can be scheduled for transmission on the network, where the time slot is relative to the time when the cycle begins. Thus, nodes on the network may send messages during each cycle, where the time when each message is to be sent is scheduled and thus known. For example, suppose that the cycle begins at a time T. A node may be configured to send a particular message at a time slot T+50 µs into the cycle. If the next cycle begins at time T' then the same node may send the same message at the same time slot in the next cycle, i.e., at time T'+50 µs. Thus, by scheduling messages to be sent at known times, a repetitive known communication pattern is established.

In various embodiments the length of the network cycle may be set to any amount of time. In one embodiment a user may be able to configure the length of the network cycle. For example, some applications may require a longer cycle time than others. Also, in various embodiments the network cycle may be configured with time slots in any of various ways. In one embodiment, a new time slot may begin at each time unit. For example, where the network cycle is measured in microseconds, a new time slot may begin at each microsecond. Thus, applications may schedule messages to be sent at any point during the cycle with microsecond resolution. The time required to transmit each message may depend on the network speed and the amount of data sent in the message.

In various embodiments, any kind of messages may be sent on the closed network 85. In one embodiment the messages may facilitate data exchange between graphical programs. For example, in one embodiment a message may represent the transmission of one or more variable values from one graphical program to another graphical program. In another embodiment a message may represent an exchange of data between a graphical program executing on a computer system and a measurement device or other device.

It is noted that a given message does not necessarily have to be sent in every cycle. However, if a message is sent during a given cycle then the message will be sent at its scheduled time slot. For example, suppose a message for transmitting the value of a variable V is scheduled at a time slot of 25 microseconds into the cycle. The variable value may not necessarily be transmitted during every cycle, e.g., may not be transmitted if the graphical program that writes to the variable V has not updated the value. However, during each cycle in which the variable value is transmitted (e.g., cycles in which the variable value has changed or been written to), the message indicating the variable value is sent 25 microseconds into the cycle.

Figure 5:
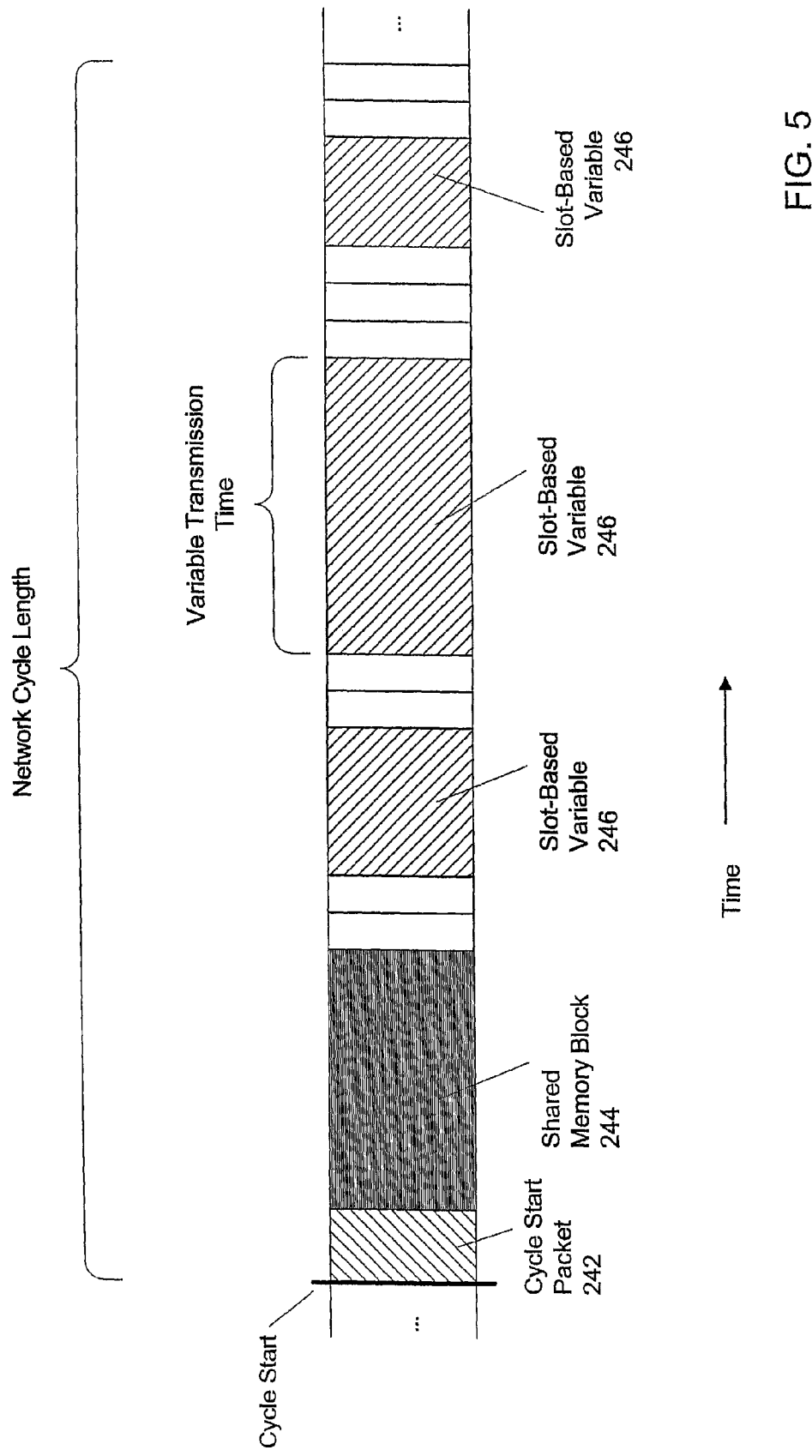
FIG. 5 illustrates an exemplary network cycle in which messages representing the transmission of variable values are scheduled to be sent on the network.

FIG. 5 illustrates an exemplary network cycle in which messages representing the transmission of variable values are scheduled to be sent on the network 85. As shown, a cycle start packet 242 may be sent at the beginning of the cycle. The cycle start packet 242 may be sent from a master node on the network 85 and may be used to synchronize all the nodes on the network 85 so that they all know when the cycle begins. In one embodiment the cycle start packet 242 may specify the time on the master node so that the other nodes on the network 85 can re-synchronize their clocks to the clock of the master node.

In this example, a shared memory block 244 representing one or more variable values is sent immediately after the cycle start packet 242. Shared memory blocks 244 are described in detail below. In this example, three slot-based variables 246 are sent at various time slots within the cycle. In this example, each slot-based variable 246 has a different transmission time, i.e., the amount of time required to transmit the variable on the network. The transmission time for a given slot-based variable 246 may depend on the amount of data to be sent, e.g., the number of bytes in the variable, and the network speed.

Thus, the nodes on the network may be configured to perform network communication on the network 85 according to a cycle where messages are scheduled to be sent at known times within the cycle. The schedule should be organized so that the transmissions of different variables (or other messages) do not overlap in time, i.e., so that there are no message conflicts. Avoiding message conflicts may enable graphical programs executing on the nodes to communicate deterministically with each other or with measurement devices or other devices on the network. The ability to communicate deterministically may enable various types of applications that would not otherwise be possible. For example, graphical programs executing on different computer systems may exchange data with each other in a synchronized manner and with a greatly reduced amount of jitter. Various examples of ways in which execution of different graphical programs can be synchronized with respect to each other or with respect to other devices are described below.

Exemplary embodiments of a closed network 85 that supports deterministic communication are described below.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. However, it is noted that the present invention can be used for a plethora of applications and is not limited to the above applications. In other words, applications discussed in the present description are exemplary only, and the present invention may be used in any of various types of systems. Thus, graphical programs as described herein may be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 6:
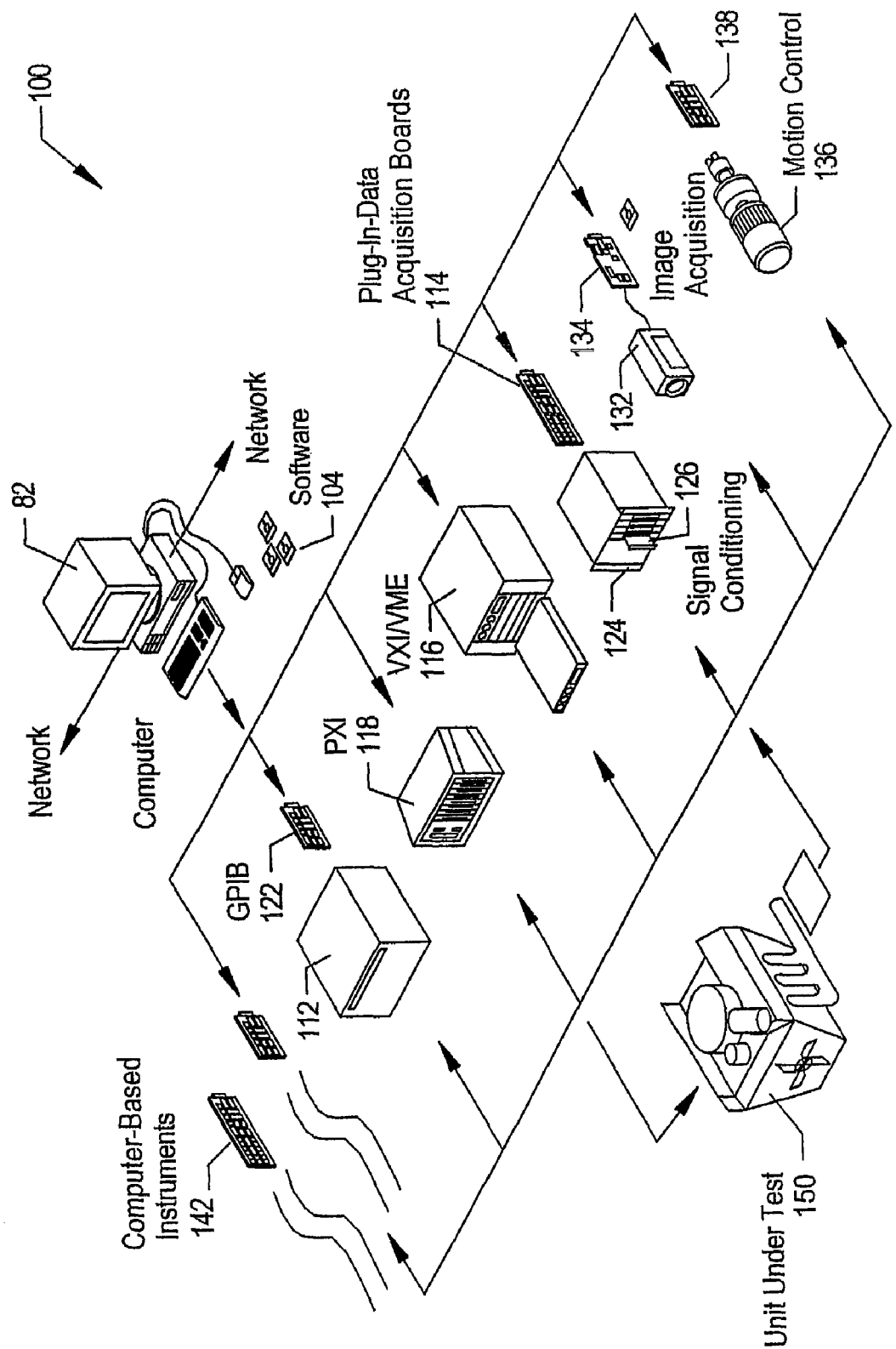
FIG. 6 illustrates an exemplary instrumentation control system.

FIG. 6 illustrates an exemplary instrumentation control system 100. The system 100 comprises a host computer 82 which connects to one or more instruments. The host computer 82 may comprise a CPU, a display screen, memory, and one or more input devices such as a mouse or keyboard as shown.

The computer 82 may operate with the one or more instruments to analyze, measure or control a unit under test (UUT) or process 150. In one embodiment the computer 82 may execute a graphical program involved with the instrumentation control system 100, where at least a portion of the functionality of the graphical program is implemented as a graphical code portion that executes in a timed loop. In one embodiment, execution of the timed loop on the computer 82 may be synchronized with operation of one or more of the instruments coupled to the computer 82.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among other types of applications.

Figure 7:
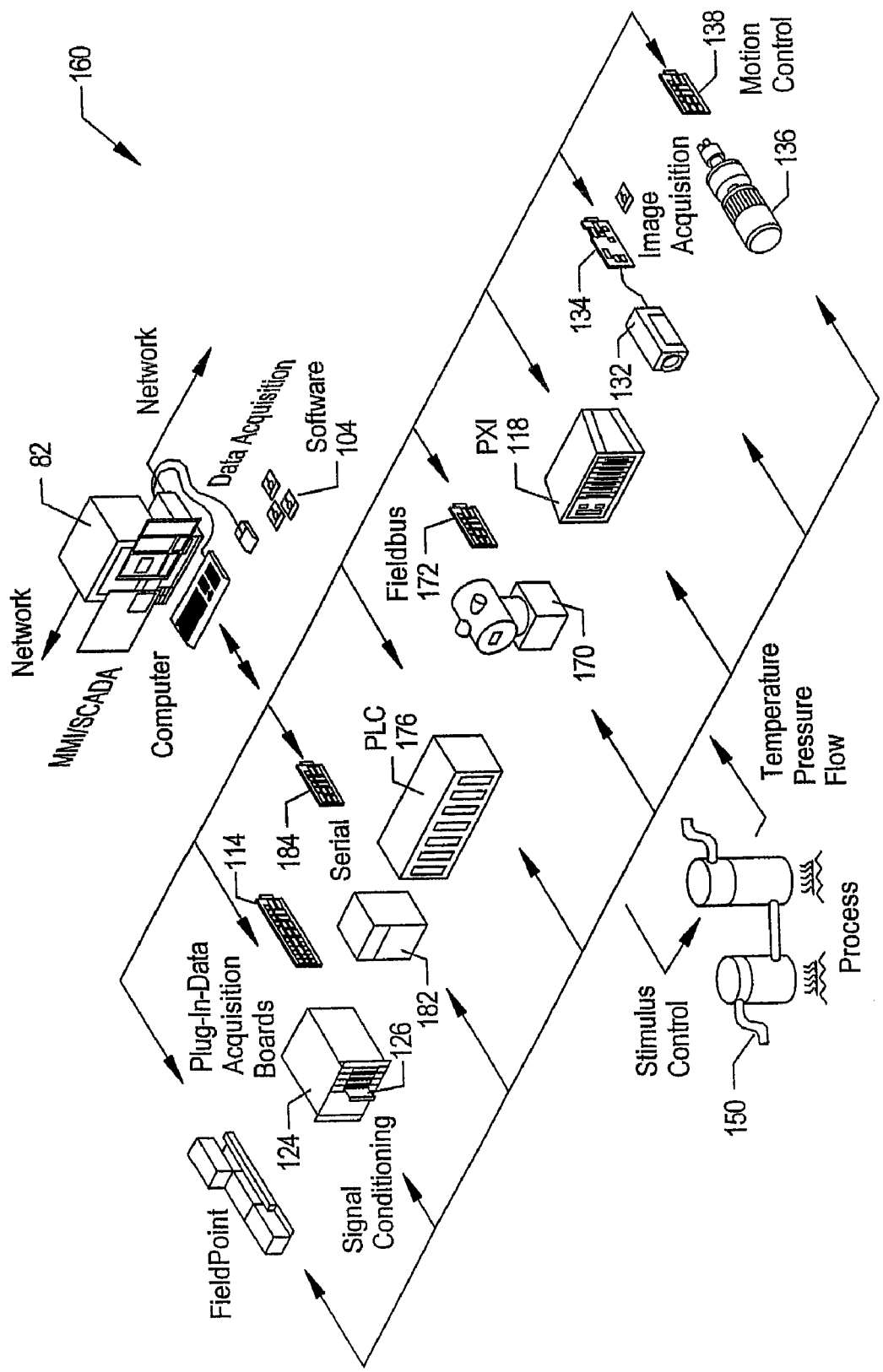
FIG. 7 illustrates an exemplary industrial automation system.

FIG. 7 illustrates an exemplary industrial automation system 160. The industrial automation system 160 is similar to the instrumentation or test and measurement system 100 shown in FIG. 6. Elements which are similar or identical to elements in FIG. 6 have the same reference numerals for convenience. The system 160 may comprise a computer 82 which connects to one or more devices or instruments. The computer 82 may comprise a CPU, a display screen, memory, and one or more input devices such as a mouse or keyboard as shown.

The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control. In one embodiment the computer 82 may execute a graphical program involved in performing the automation function, where at least a portion of the functionality of the graphical program is implemented as a graphical code portion that executes in a timed loop. In one embodiment, execution of the timed loop on the computer 82 may be synchronized with operation of one or more of the devices or instruments coupled to the computer 82.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 6 and 7 above, one or more of the various devices may couple to each other over a network, such as the Internet, an Intranet, or a LAN. In one embodiment, the user operates to select a target device from a plurality of possible target devices for programming or configuration using a graphical program. Thus, the user may create a graphical program on a computer and use (execute) the graphical program on that computer or may deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 6 and 7 may be referred to as virtual instruments.

Figure 8:
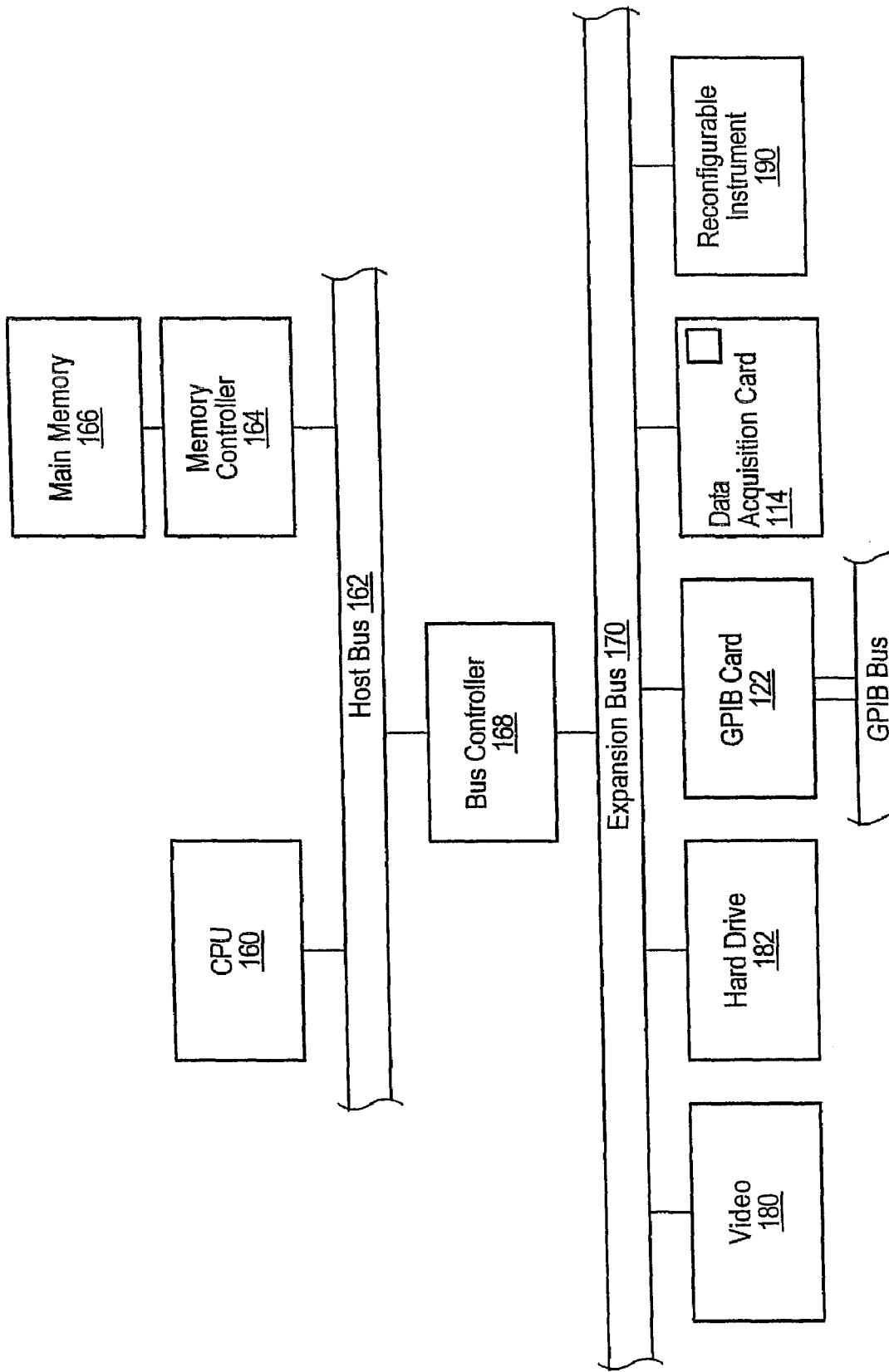
FIG. 8 is a block diagram representing one embodiment of the computer systems illustrated in FIGS. 1, 2, 3, 6 and 7.

FIG. 8—Computer System Block Diagram

FIG. 8 is a block diagram representing one embodiment of the computer system 82 illustrated in FIGS. 1, 2, 3, 6 and 7. It is noted that any type of computer system configuration or architecture can be used as desired, and FIG. 8 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store a graphical program configured to perform a timed loop. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. In the illustrated embodiment, the computer 82 further comprises a video display subsystem 180 and hard drive 182 coupled to the expansion bus 170.

As shown, a device 190 may also be connected to the computer. In one embodiment the device 190 may include a processor and memory which may execute a real time operating system. In another embodiment the device 190 may also or may instead include a programmable hardware element. In one embodiment the computer system 82 may be operable to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code that was generated from either the graphical program or from text code that in turn was generated from the graphical program.

Synchronizing Execution of Graphical Programs

FIG. 9 is a flowchart diagram illustrating one embodiment of a method for synchronizing execution of a graphical program executing on one device with a graphical program executing on another device and/or with operation of another device. It is noted that FIG. 9 illustrates a representative embodiment, and alternative embodiments are contemplated.

In 281, a first graphical code portion may be included in a first graphical program, where the first graphical program is to be executed on a first device. As described above, the first graphical program may include a plurality of interconnected nodes that visually indicate functionality of the first graphical program. The first graphical code portion may comprise one or more nodes to be executed in the first graphical program.

In 283, the first graphical program may be configured to execute the first graphical code portion for a plurality of iterations, where the iterations of the first graphical code portion are timed based on a clock of a second device. For example, in one embodiment the first graphical code portion may be associated with or included in a timed loop. As described above, the timed loop may be operable to control execution timing of the loop iterations, e.g., by causing each iteration to begin executing at a certain time. In one embodiment the clock of the second device may be used as the timing source for the timed loop.

In 285, the first graphical program may be executed on the first device. In various embodiments the first device may comprise a device of any kind. In one embodiment the first graphical program may execute on a computer system 82. In another embodiment, a programmable hardware element may be configured with the first graphical program.

As indicated in 287, during execution of the first graphical program, iterations of the first graphical code portion are timed based on the clock of the second device. Thus, execution of the first graphical code portion in the first graphical program may be synchronized with the clock of the second device. The execution may be synchronized in any of various ways. For example, in one embodiment each tick or pulse of the clock of the second device may cause an iteration of the first graphical code portion to begin executing. As another example, the first graphical code portion may be configured with an execution period N such that every Nth tick or pulse of the clock of the second device causes an iteration of the first graphical code portion to begin executing.

In various embodiments, iterations of the first graphical code portion may be timed based on the clock of the second device in any of various ways. For example, in one embodiment, a clock of the first device may be synchronized with the clock of the second device, and ticks or pulses of the clock of the first device may then be used to cause iterations of the first graphical code portion to begin executing. In another embodiment, ticks or pulses of the clock of the second device may directly cause iterations of the first graphical code portion to begin executing.

In various embodiments, the second device may comprise a device of any kind, and the clock of the second device may comprise a clock or other timing source of any kind. In one embodiment the second device may comprise a computer system. In one embodiment the second computer system may execute a second graphical program. For example, the second graphical program may be configured to execute a second graphical code portion for a plurality of iterations, where the iterations of the second graphical code portion are also timed based on the clock of a second device. Thus, the clock of the second device may act as a common timing source that synchronizes execution of both the first graphical code portion iterating in the first graphical program and the second graphical code portion iterating in the second graphical code portion. As one example, the synchronization may enable the two graphical programs to exchange data in a synchronized or deterministic manner.

In another embodiment the second computer system may not execute a second graphical program. However, the clock of the second computer system may still be used to synchronize the execution of the first graphical program with a second graphical program. For example, a third computer system may execute the second graphical program, where timing of a second graphical code portion in the second graphical program is also based on the clock of the second computer system. Thus, the first graphical code portion on the first computer system and the second graphical code portion on the third computer system may execute in synchronization with each other, since the timing for both is based on the clock of the second computer system. For example, the second computer system may comprise a master node on a closed network 85, and the clock of the master node may be used as a common timing source for both the first graphical code portion and the second graphical code portion.

In another embodiment the second device may comprise a device other than a computer system. In one embodiment the second device may comprise a measurement device. For example, in one embodiment the second device may comprise a DAQ device. Thus, execution of the first graphical code portion in the first graphical program may be synchronized with the clock of the measurement device. This may enable the first graphical code portion to be executed iteratively in synchronization with operation of the measurement device. In various embodiments the measurement device may perform any kind of measurement function or other operation, and the first graphical code portion may be synchronized with operation of the measurement device in any of various ways. As one example, the clock of the measurement device may control timing of measurements of a physical system or unit under test. Thus, the rate of execution of the first graphical code portion may be synchronized with a rate at which the measurements are performed.

Figure 10:
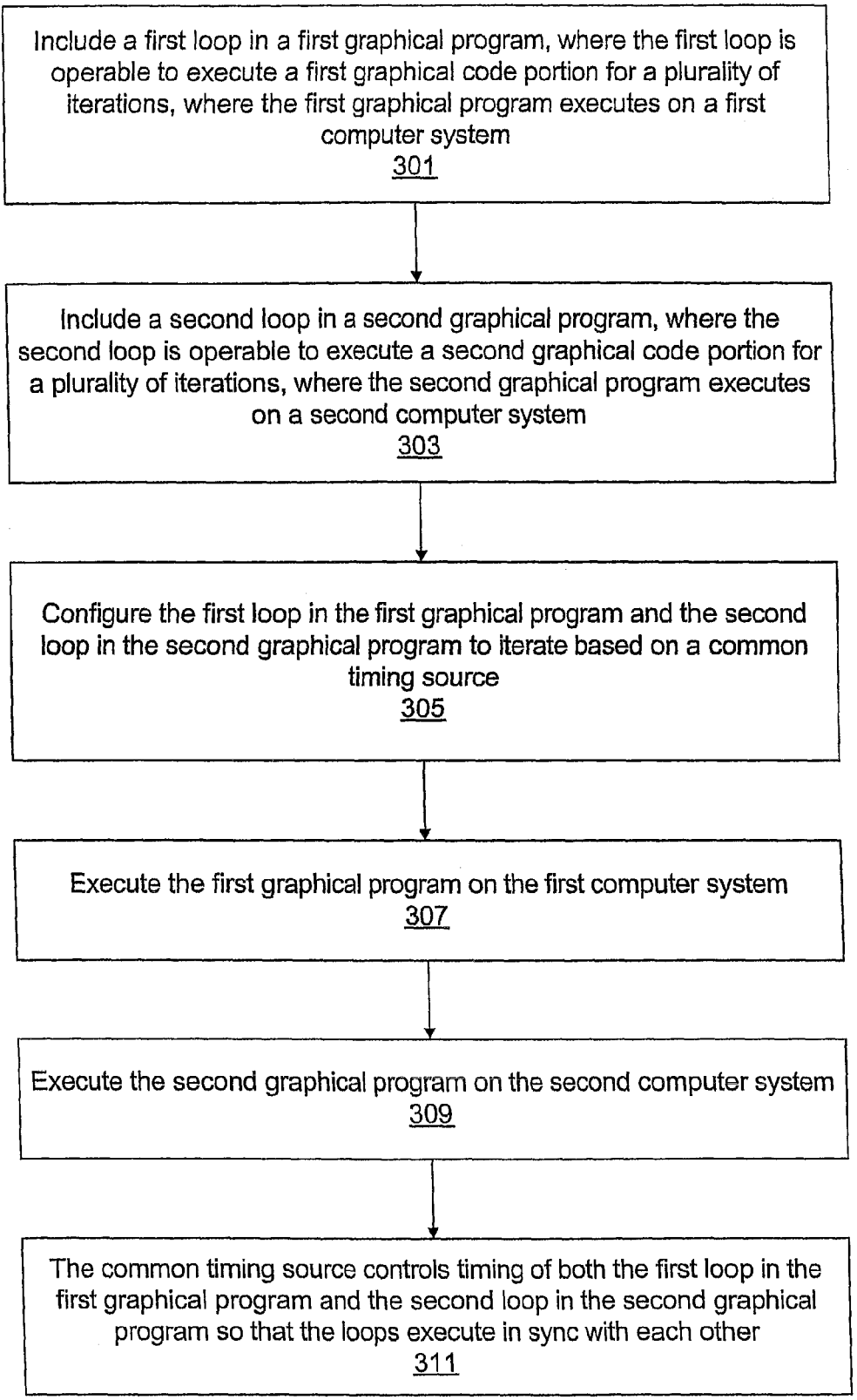
FIG. 10 is a flowchart diagram illustrating one embodiment of a method for enabling two graphical programs to execute in synchronization with each other.

FIG. 10 is a flowchart diagram illustrating one embodiment of a method for enabling two graphical programs to execute in synchronization with each other. It is noted that FIG. 10 illustrates a representative embodiment, and numerous alternative embodiments are contemplated. Also, various elements may be combined, omitted, or performed in different orders.

In 301, a first loop may be included in a first graphical program, where the first loop is operable to execute a first graphical code portion for a plurality of iterations, where the first graphical program executes on a first computer system.

In 303, a second loop may be included in a second graphical program, where the second loop is operable to execute a second graphical code portion for a plurality of iterations, where the second graphical program executes on a second computer system.

In 305, the first loop in the first graphical program and the second loop in the second graphical program may be configured to iterate based on a common timing source.

In 307, the first graphical program may be executed on the first computer system.

In 309, the second graphical program may be executed on the second computer system.

In 311, the common timing source controls timing of both the first loop in the first graphical program and the second loop in the second graphical program so that the loops execute in synchronization with each other.

FIG. 11 is a flowchart diagram illustrating another embodiment of a method for synchronizing execution of a graphical program executing on one device with a graphical program executing on another device and/or with operation of another device. It is noted that FIG. 11 illustrates a representative embodiment, and alternative embodiments are contemplated.

In 291, a first graphical code portion may be included in a first graphical program, where the first graphical program is to be executed on a first device, similarly as described above with respect to 281.

In 293, the first graphical program may be configured to execute the first graphical code portion for a plurality of iterations, where the iterations of the first graphical code portion are timed based on events originating from a second device. In one embodiment the events may comprise information sent from the second device to the first device. In this embodiment the events may originate directly from the second device. In another embodiment the events may be generated on the first device in response to receiving information from the second device. In this embodiment the events may originate indirectly from the second device. For example, an event may be generated on the first device in response to receiving one or more messages from the second device.

In various embodiments an event may represent any of various types of network communication. Thus, the events originating from the second device may also be referred to as network events. As one example, an event may represent or indicate the arrival of a particular kind of message. In various embodiments an event may represent or indicate the arrival of a message of any kind.

As described above, in one embodiment, devices may send messages representing variable values at scheduled time slots on a closed network 85. Thus, in one embodiment an event may be associated with a particular variable. As one example, an event may be generated in response to receiving a message representing data for a variable V. For example, a second graphical program executing on the second device may write data to the variable V, which causes the data to be sent over the network to the first device.

In 295, the first graphical program may be executed on the first device.

As indicated in 297, during execution of the first graphical program, iterations of the first graphical code portion may be timed based on the events originating from the second device. Thus, execution of the first graphical code portion in the first graphical program may be synchronized with the events originating from the second device. This may allow the execution of the first graphical code portion to be synchronized with operation of the second device in any of various ways. For example, an event may be generated each time the second device performs a particular operation. In one embodiment each event may cause an iteration of the first graphical code portion to begin executing so that the first graphical code portion is executed on the first device each time the second device performs the operation. As another example, the first graphical code portion may be configured with an execution period N such that every Nth event originating from the second device causes an iteration of the first graphical code portion to begin executing.

In various embodiments, the second device may comprise a device of any kind, and the events originating from the second device may represent any kind of operation performed by the second device or any kind of network communication sent by the second device. In one embodiment the second device may comprise a computer system. In one embodiment the second computer system may execute a second graphical program. The method may enable execution of the first graphical program on the first device to be synchronized with execution of the second graphical program on the second device. For example, the second graphical program may be configured to execute a second graphical code portion for a plurality of iterations. For example, in one embodiment, each iteration of the second graphical code portion may perform an operation or send a message that causes an iteration of the first graphical code portion to occur on the first device.

As one example, each iteration of the second graphical code portion may write to a variable V. In response to the second graphical code portion writing to the variable V, the data written may be sent over the network to the first device. For example, network communication software may be operable to detect that the graphical program wrote to the variable V and may send the data over the network. The first graphical code portion on the first device may be configured with a timing source based on the variable V to cause the timing source to generate an event causing the first graphical code portion to execute in response to the data for the variable V arriving at the first device.

Thus, in this example, the second graphical code portion executing on the second device effectively drives or controls the timing of execution of the first graphical code portion executing on the first device. If the second graphical code portion writes to the variable V in every iteration, then every iteration of the second graphical code portion may cause an iteration of the first graphical code portion to occur. However, if the second graphical code portion does not write to the variable V in a given iteration then that iteration of the second graphical code portion may not cause a corresponding iteration of the first graphical code portion to occur.

In another embodiment the second device may comprise a device other than a computer system. In one embodiment the second device may comprise a measurement device. For example, in one embodiment the second device may comprise a DAQ device. For example, an event may be generated on the first device in response to the measurement device sending data over the network. Thus, execution of the first graphical code portion in the first graphical program may be synchronized with operation of the measurement device. In various embodiments the measurement device may perform any kind of measurement function or other operation, and the first graphical code portion may be synchronized with operation of the measurement device in any of various ways.

It is noted that in another embodiment of the method the iterations of the first graphical code portion may be timed based on network events of any kind, regardless of whether they originate from a second device. As one example, a variable V may be scheduled for transmission at a particular time slot during the network cycle, and an event may be generated when the time slot for the variable V occurs, where the event causes the first graphical code portion to iterate. In this example, the event may be generated on the first device during a particular cycle of the network regardless of whether a second graphical code portion on the second device sent a data value for the variable V during that cycle.

As another example the first graphical program may be configured to write to a variable R, where the variable R is scheduled to be transmitted at a particular time slot during the network cycle. Thus, if data has been written to the variable R then the data for the variable may be sent when the time slot occurs. In one embodiment an event may be generated when the data for the variable is sent.

It is noted that although the methods described above are discussed in terms of controlling timing of iterations of a first graphical code portion, it is noted that alternative embodiments of the methods may be used to control execution timing of any kind of graphical code portion, regardless of whether or not the graphical code portion is executed in a loop or executed for a plurality of iterations. In one embodiment the first graphical code portion may comprise a sequence of sub-portions to be executed sequentially. Each sub-portion of the first graphical code portion may comprise one or more nodes. When the first graphical code portion is executed, the sequence of sub-portions may be executed sequentially. Execution of one or more of the sub-portions may be timed based on the at least one of a clock of a second device, events originating from a second device, or any of various types of network events.

Figure 12:
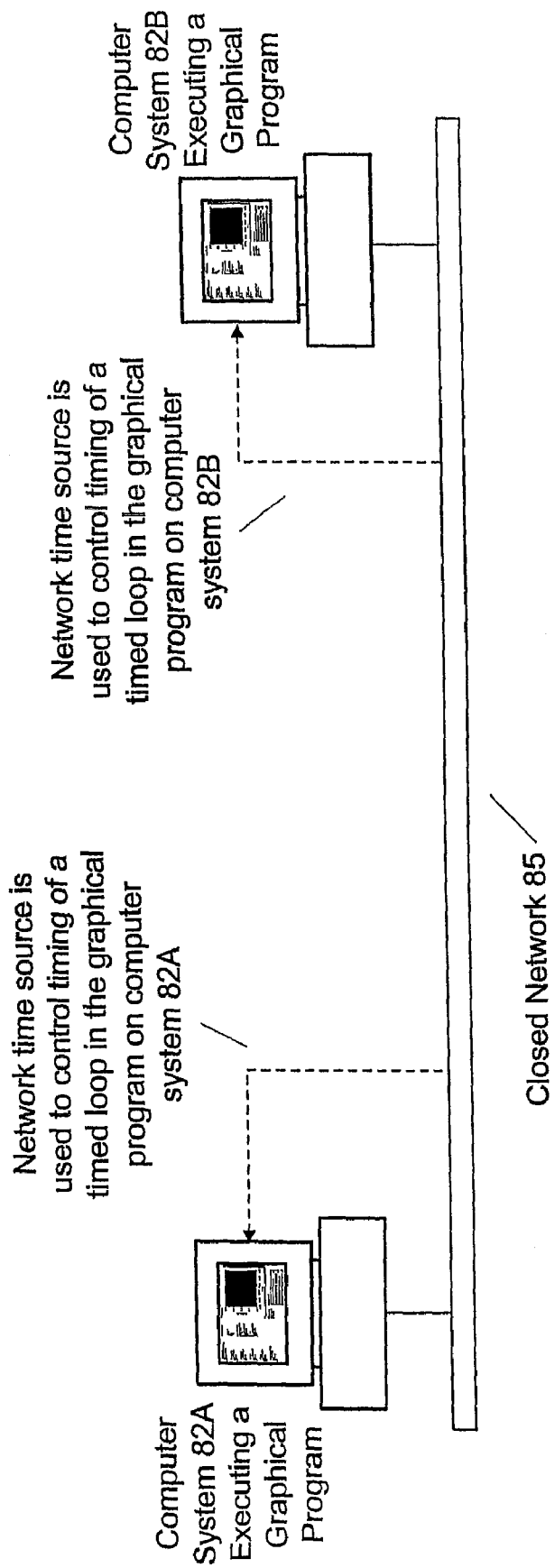
FIGS. 12-14 illustrate exemplary systems in which graphical programs executing on computer systems are synchronized with respect to graphical programs executing on other computer systems and/or with respect to measurement devices.

FIG. 12 illustrates an exemplary system including computer systems 82A and 82B coupled to a closed network 85. Each of the computer systems executes a graphical program. In this example, a network time source (e.g., clock of a master node on the network 85) controls timing of timed loops in each graphical program. Thus, the timed loops on each computer system may execute in sync with each other since they are both timed based on the network time source.

Although FIG. 12 and other synchronization examples illustrate devices coupled to a closed network 85, it is noted that in other embodiments the devices may be coupled to other kinds of networks, such as a public network 84 or network 86.

Figure 13:
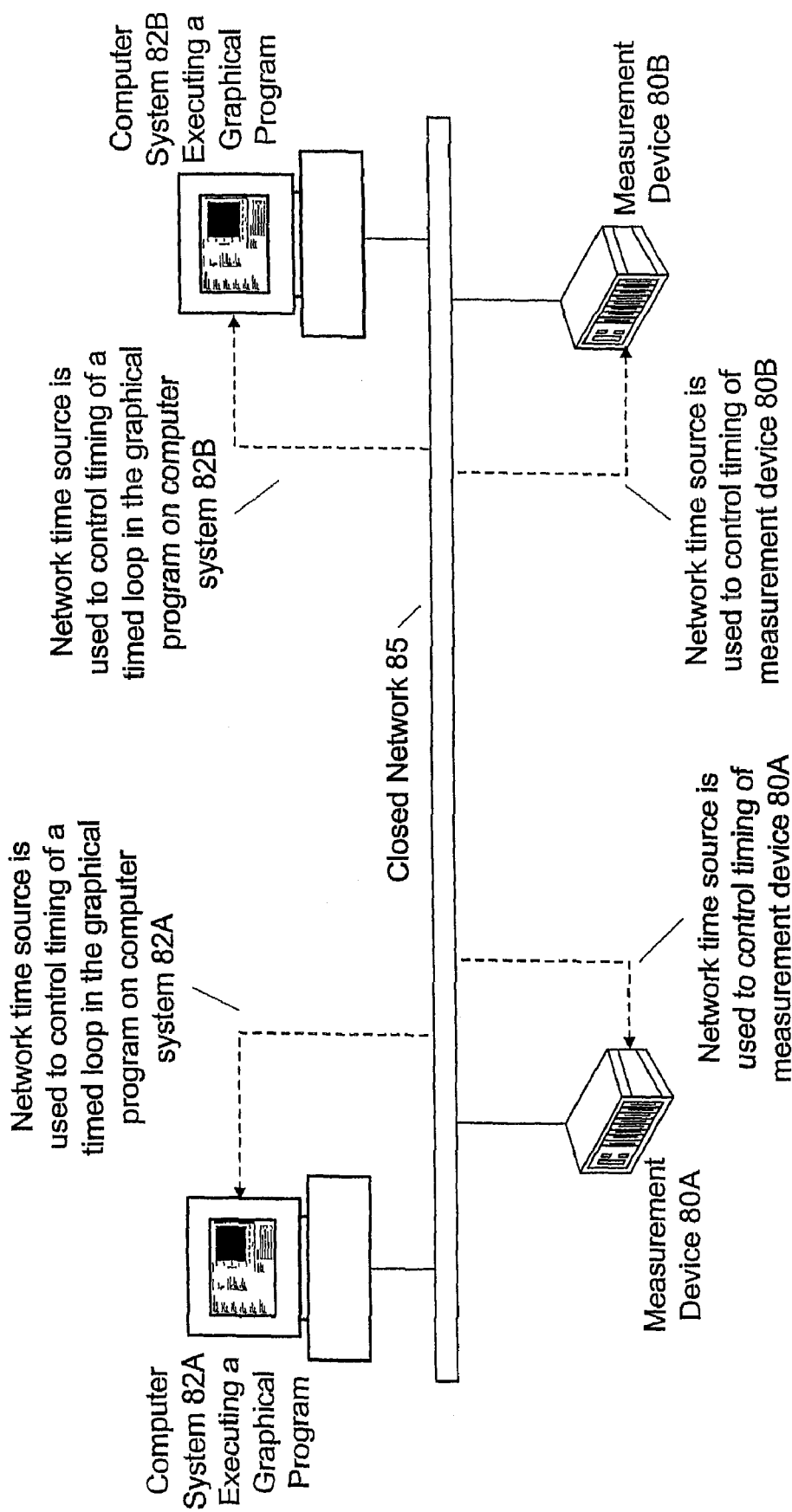

FIG. 13 illustrates a system similar to the system of FIG. 12, with additional measurement devices 80A and 80B coupled to the network 85. The network time source also controls timing of the measurement devices. For example, a clock on each measurement device may be synchronized to the network time source. Thus, operation of the measurement devices may be synchronized with operation of the timed loops in the graphical programs.

Figure 14:
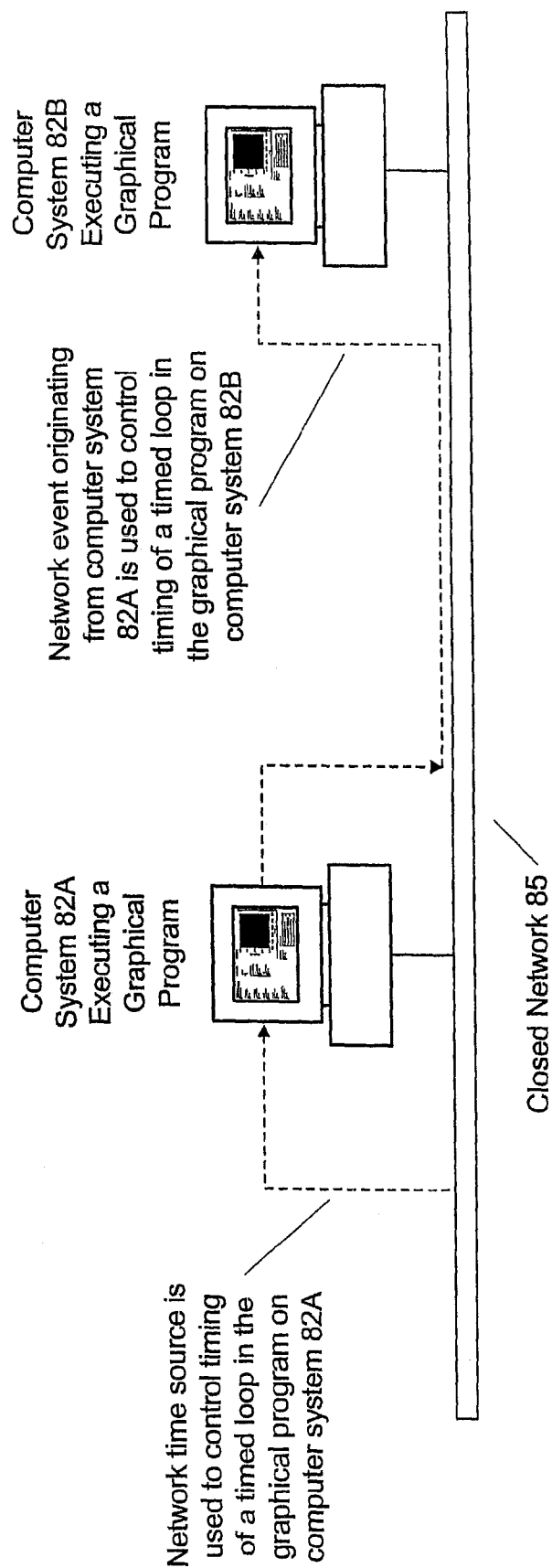

In the example of FIG. 14, the network time source controls timing of the timed loop in the graphical program on computer system 82A. A network event originating from the graphical program on the computer system 82A controls timing of the timed loop in the graphical program on the computer system 82B. Thus, the timed loop in the graphical program on computer system 82A drives or controls timing of the timed loop in the graphical program on computer system 82B. In one embodiment the events may be generated in sync with the network time source so that the timed loop on computer system 82B is indirectly synchronized with the network time source.

Figure 15:
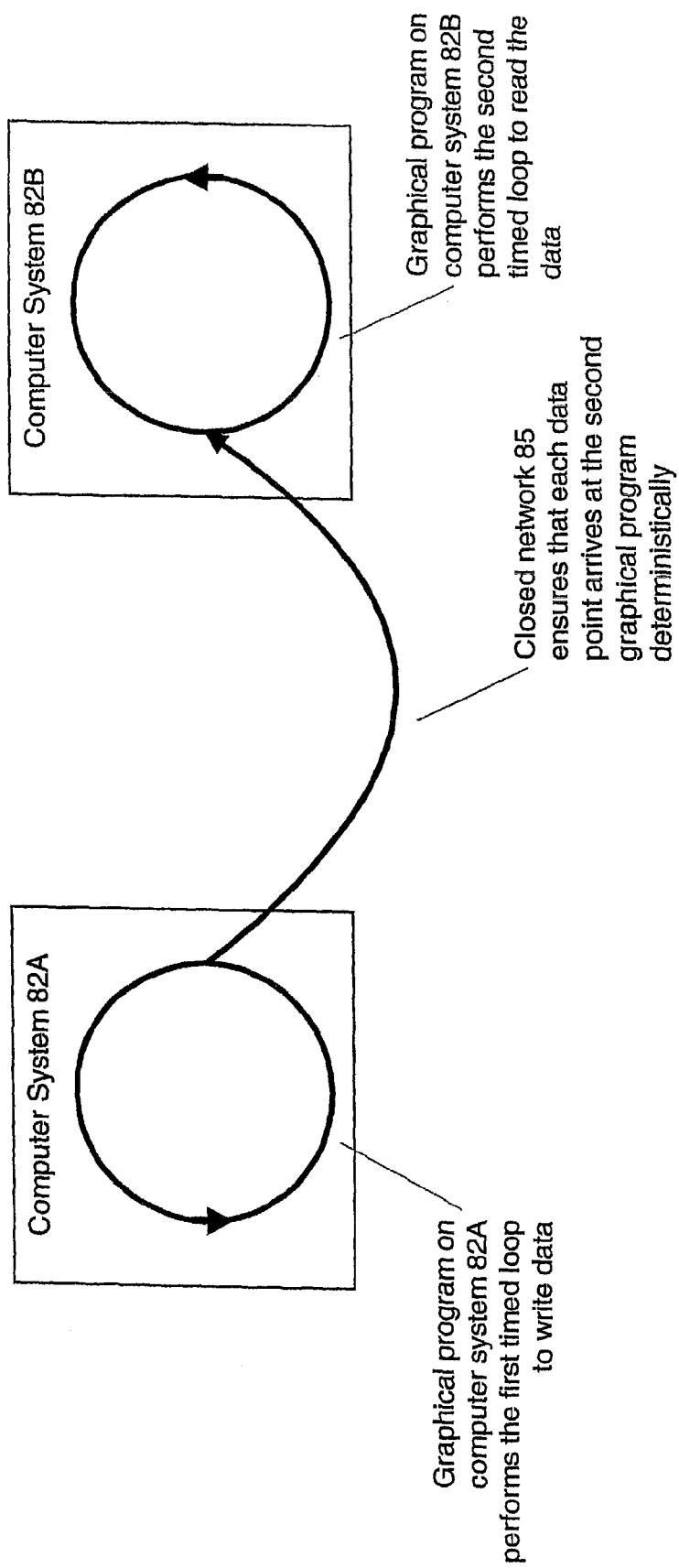
FIG. 15 illustrates an exemplary system in which each data point written by the graphical program on one computer system is delivered to the graphical program on another computer system in synchronization with a network cycle.

In one embodiment the graphical program on computer system 82A may write data in synchronization with a cycle of the network. For example, a first timed loop in the graphical program may be timed based on the cycle of the network. A deterministic communication engine may transport the data over the closed network 85 to the graphical program on computer system 82B. The closed network 85 may ensure that each data point written by the graphical program on computer system 82A is delivered to the graphical program on computer system 82B in sync with the network cycle, as shown in FIG. 15. For example, the network 85 may be configured to transmit the data written by the graphical program on computer system 82A at a scheduled time slot during the network cycle. The graphical program on computer system 82B may perform a second timed loop to read the data sent from the computer system 82A. The second timed may be timed based on the network cycle so that the second timed loop operates in sync with the first timed loop.

Figure 16:
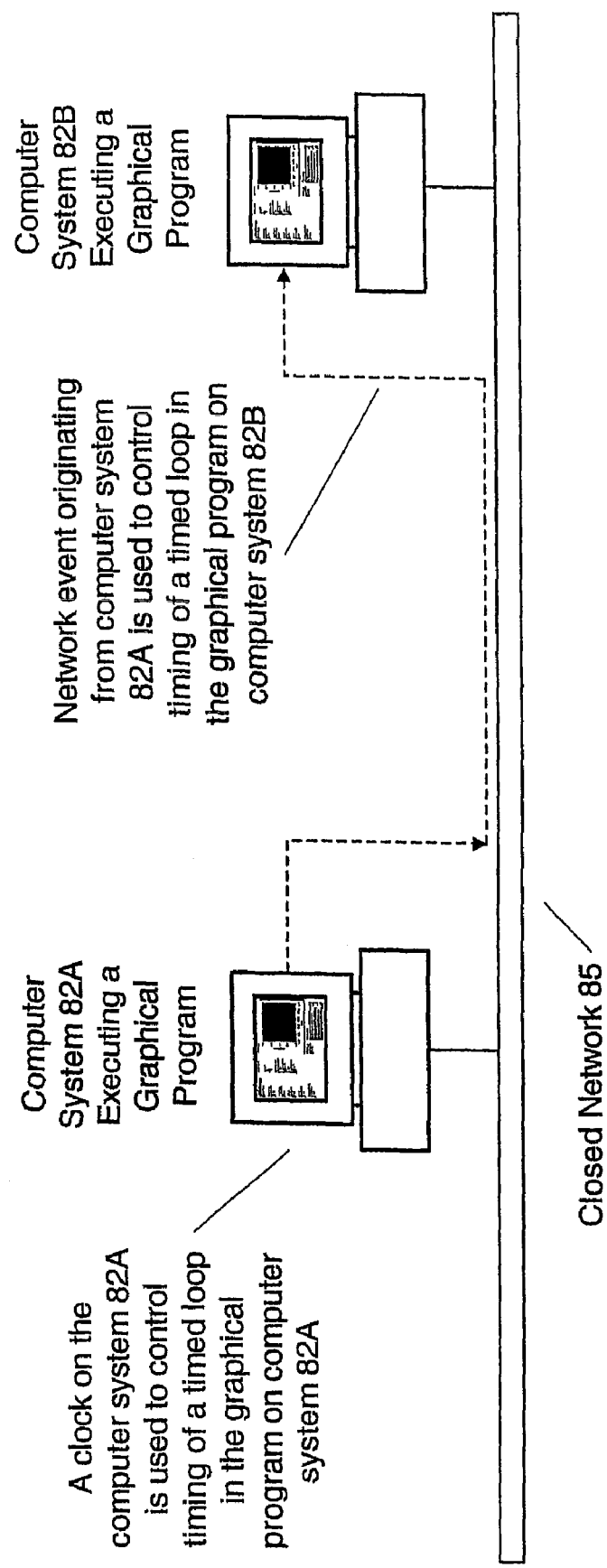
FIGS. 16 and 17 illustrate exemplary systems in which graphical programs executing on computer systems are synchronized with respect to graphical programs executing on other computer systems and/or with respect to measurement devices.

FIG. 16 illustrates an example similar to the example of FIG. 14. However, in this embodiment the timed loop in the graphical program on computer system 82A is controlled by a clock on the computer system 82A instead of the network clock. Thus, the events that drive the timed loop in the graphical program on computer system 82B may be generated in sync with the clock on the computer system 82A.

Figure 17:
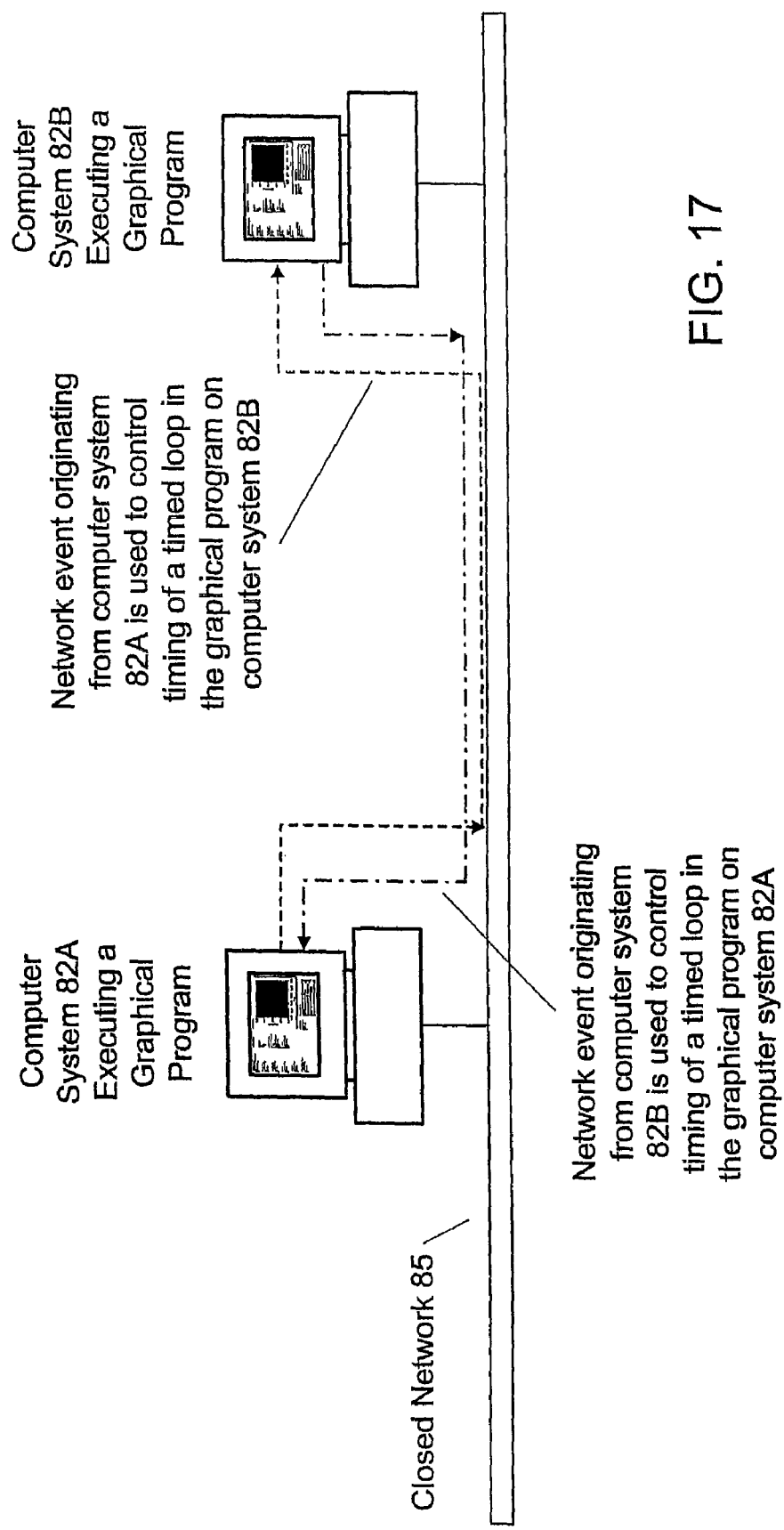

In the example of FIG. 17, the timed loop in the graphical program on computer system 82A causes network events to occur that drive or control timing of the timed loop in the graphical program on computer system 82B. In turn, the timed loop in the graphical program on computer system 82B causes network events to occur that drive or control timing of the timed loop in the graphical program on computer system 82A. Thus, the system performs a closed loop in which the timed loop on each computer system drives the timed loop on the other computer system. Such a closed loop may be utilized to perform any of various applications. In one embodiment the closed loop may be used to perform data exchange between the two graphical programs.

Figure 18:
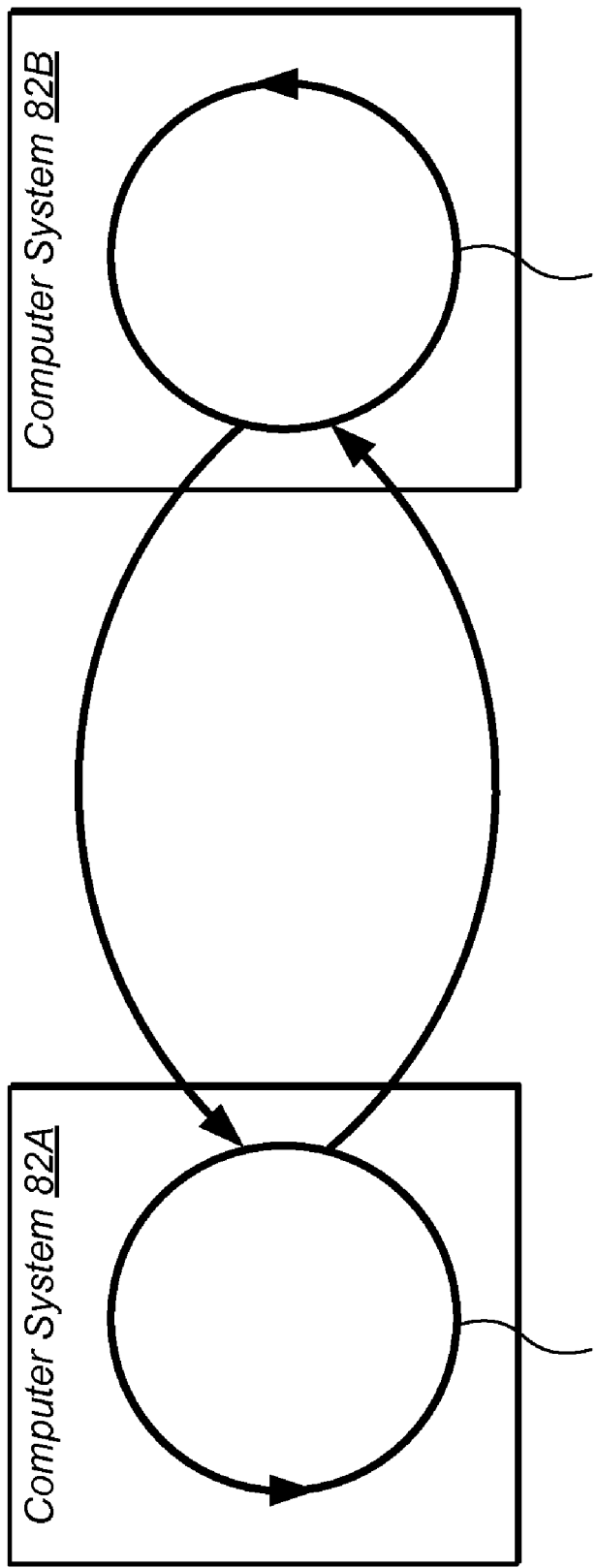
FIG. 18 illustrates an example of data exchange in which a graphical program on one computer system performs a first timed loop to write data to a first variable and read data from a second variable, and a graphical program on another computer system performs a second timed loop to read data from the first variable and write data to the second variable.

FIG. 18 illustrates an example of data exchange. The graphical program on computer system 82A performs the first timed loop to write data to a first variable and read data from a second variable. The graphical program on computer system 82B performs the second timed loop to read data from the first variable and write data to the second variable. Any of the various methods described herein may be used to synchronize the data exchange between the two graphical programs, such as controlling timing of the timed loops in the graphical programs based on network events or based on a common clock.

Figure 19:
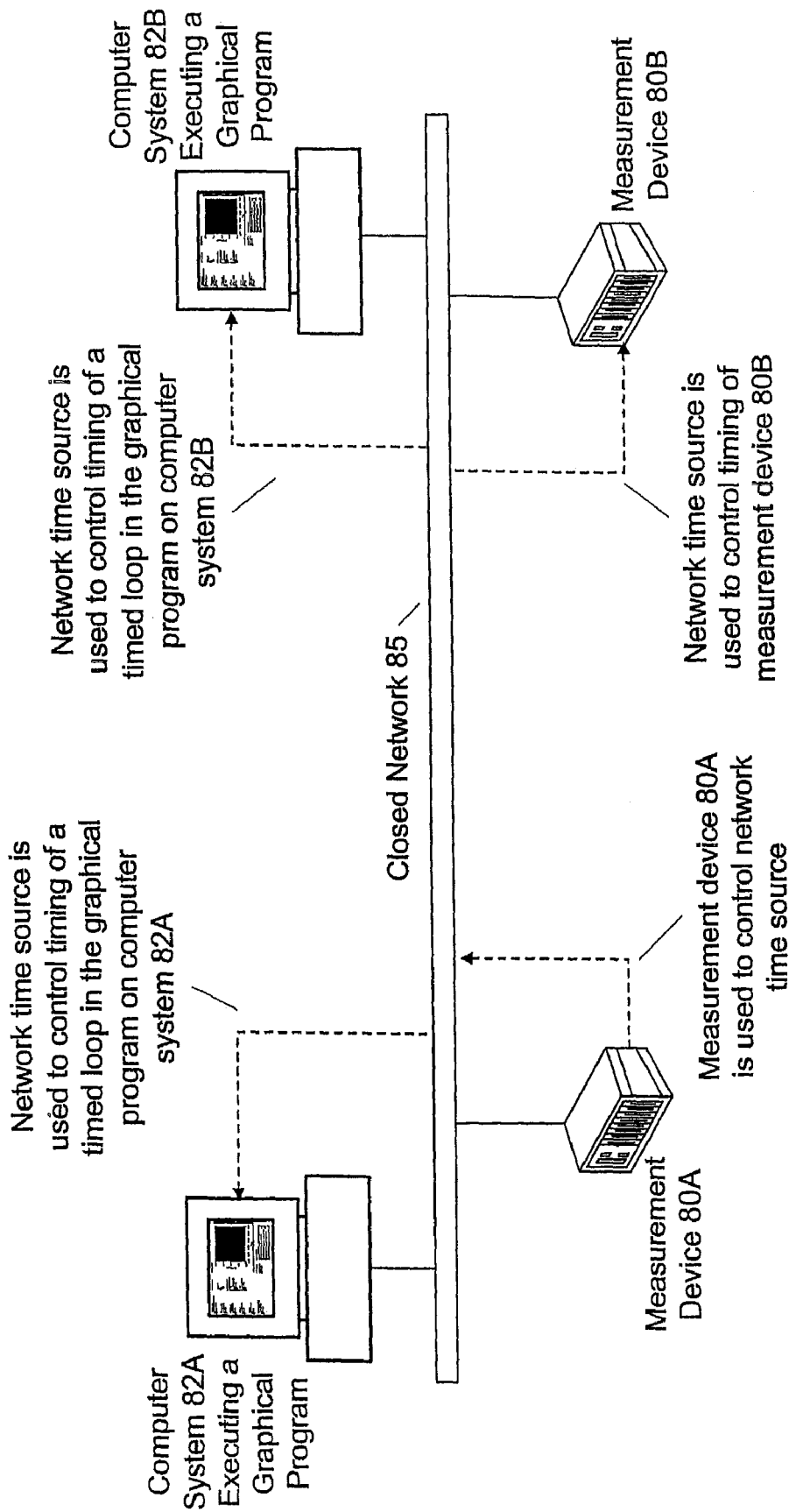
FIGS. 19-21 illustrate exemplary systems in which graphical programs executing on computer systems are synchronized with respect to graphical programs executing on other computer systems and/or with respect to measurement devices.

FIG. 19 illustrates an example in which a measurement device 80A is used to control a network time source. For example, clocks of one or more other devices on the network 85 may be synchronized to a clock of the measurement device 80A. For example, in one embodiment clocks of the computer system 82A, computer system 82B, and measurement device 80B may be synchronized directly to the clock of the measurement device 80A. In another embodiment a clock of another device may be synchronized to the clock of the measurement device 80A and may then be used to indirectly synchronize the clocks of computer system 82A, computer system 82B, and measurement device 80B to the clock of the measurement device 80A. For example, a master node clock may be synchronized to the clock of the measurement device 80A, and the clocks of the other devices may be synchronized to the clock of the master node.

Synchronizing the clocks of the other devices on the network 85 may enable the other devices to operate in sync with the measurement device 80A. For example, the computer systems 82A and 82B may execute graphical programs that are timed in sync with the measurement device 80A. Similarly, the measurement device 80B may operate in sync with the measurement device 80A.

Figure 20:
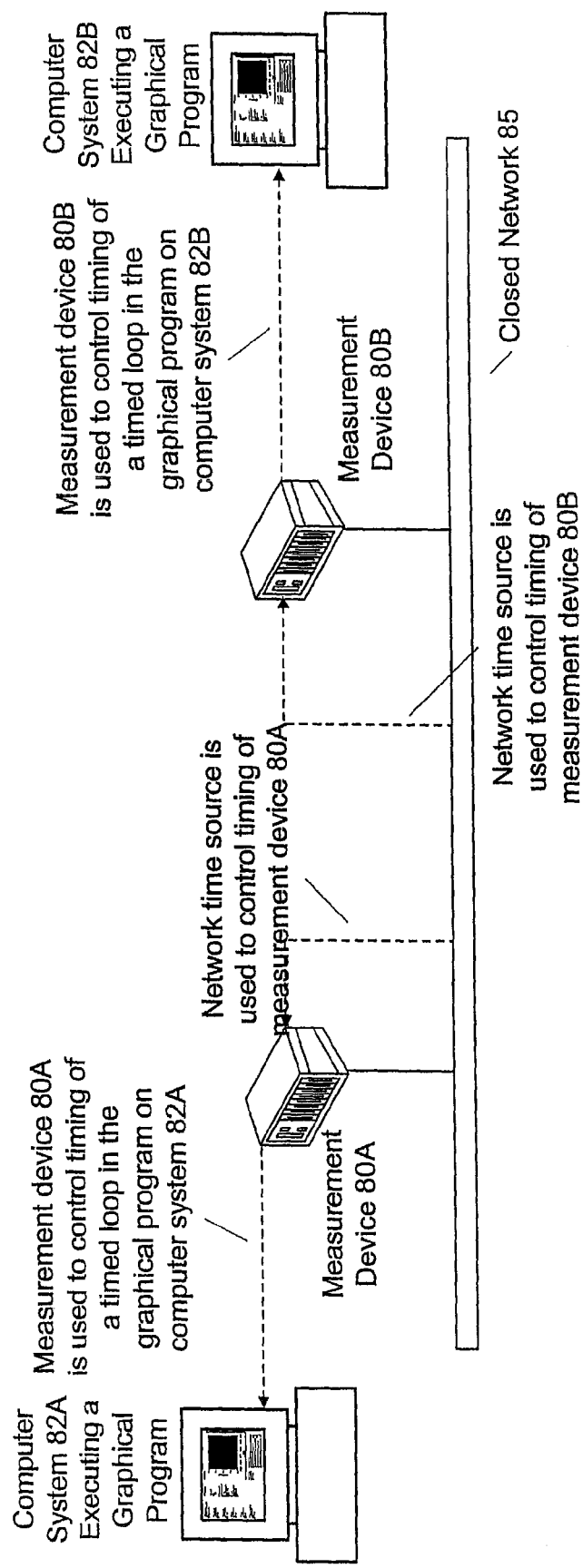

In the example of FIG. 20 a measurement device 80A is coupled to a computer system 82A. A network time source or clock is used to control timing of the measurement device 80A. The measurement device 80A is then used to control timing of a timed loop in a graphical program executing on the computer system 82A. Similarly, the network time source or clock is used to control timing of the measurement device 80B. The measurement device 80B is then used to control timing of a timed loop in a graphical program executing on the computer system 82B.

Figure 21:
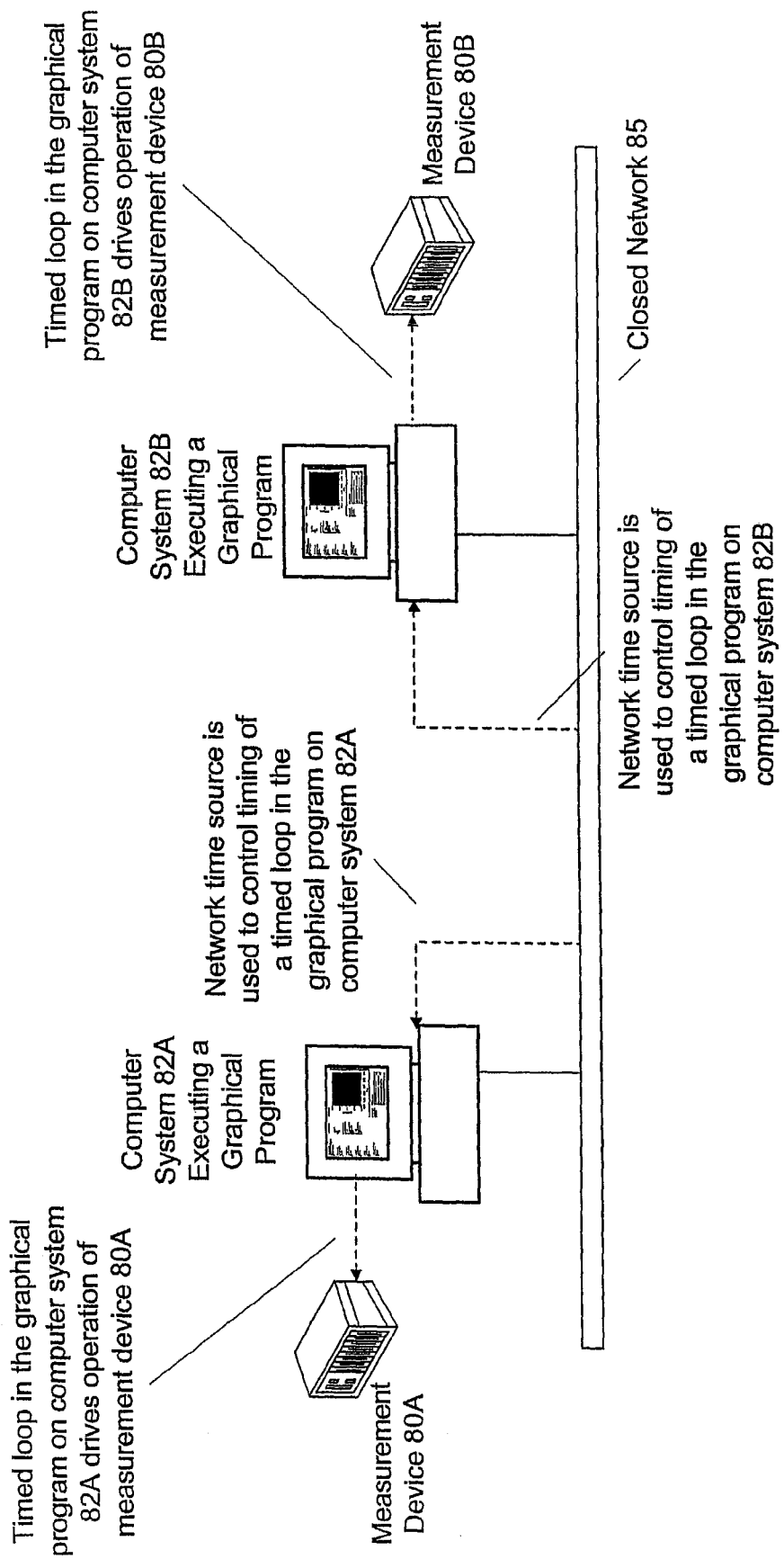

In FIG. 21 a network time source is used to control timing of a timed loop in the graphical program on computer system 82A. The timed loop in the graphical program on computer system 82A drives operation of the measurement device 80A, e.g., so that the measurement device 80A operates in synchronization with the network time source. Similarly, the network time source is used to control timing of a timed loop in the graphical program on computer system 82B. The timed loop in the graphical program on computer system 82B drives operation of the measurement device 80B, e.g., so that the measurement device 80B operates in synchronization with the network time source.

It is noted that although the examples above illustrate devices coupled to a network 85, in other embodiments the devices may be coupled to other types of networks, such as a regular Ethernet network or any of various other types of LANs, or to an Intranet, etc.

As described above, in many applications, a graphical program may perform data exchange with other graphical programs or with other devices. In various embodiments the data exchange may be configured in any of various ways. In one embodiment the graphical programming development environment may provide a variable abstraction framework that allows users to easily configure their graphical programs to exchange data in a timed or synchronized manner through the use of variables. The variable abstraction framework may decrease the complexity of configuring the appropriate timing of communication between different graphical programs. For example, as described below, in one embodiment a user may configure a deterministic shared variable by selecting a time slot for it. The user may then include the deterministic shared variable in a graphical program and configure the graphical program to write data to the variable. A deterministic communication engine supported by the graphical programming development environment may be responsible for delivering the variable value over the network at its configured time slot. An exemplary variable abstraction framework that allows users to configure graphical programs to exchange data in a deterministic or time-triggered manner is described in detail below.

Thus, the user may be required to do very little to enable the data exchange between different graphical programs, other than scheduling the times when variable values are transmitted over the network. Also, the graphical programming development environment may provide a configuration tool that aids the user in scheduling variable transmission times, as described below.

Various methods for controlling the timing of a graphical program (or controlling the timing of iterations of a graphical code portion in the graphical program) and synchronizing the graphical program with other graphical programs or with operation of other devices are described above.

For example, in one embodiment an iteration of a graphical code portion in a graphical program may be configured to execute at a particular time relative to the network cycle start time. In various embodiments the graphical programming development environment may enable the user to configure the graphical code portion to begin executing with any precision. For example, in one embodiment the user can configure the graphical code portion to begin executing at any point during the cycle, with microsecond resolution. For example, the length of the network cycle may be 1000 microseconds, and an iteration of the graphical code portion may be configured to execute at 200 microseconds into every cycle. For example, in one embodiment the graphical program may include a timed loop, and the graphical code portion may be included in or associated with the timed loop. The timed loop may be configured with timing information causing it to execute the graphical code portion at 200 microseconds into every cycle.

In another embodiment an iteration of a graphical code portion in a graphical program may be configured to execute in response to a network event of some kind. As one example, an iteration of the graphical code portion may be configured to execute when particular data, e.g., a variable value or other data, is received. In this embodiment the graphical code portion may not be executed during every cycle of the network. Instead, the graphical code portion may be executed only if the variable value (or other data) is received.

As another example, an iteration of the graphical code portion may be configured to execute when particular data, e.g., a variable value or other data, is sent. For example, the graphical program may include a graphical code portion may be operable to write a data point to a variable in each iteration of a loop. The loop may be configured to wake up the graphical code portion (i.e., cause a new iteration of the graphical code portion to begin executing) in response to the variable value being sent. The graphical code portion may then prepare a new data point to write to the variable.

As another example, an iteration of the graphical code portion may be configured to execute when transmission of particular data, e.g., transmission of a variable value or other data, begins or may be configured to execute when transmission of the data ends.

Thus, in various embodiments, the timing of execution of the graphical code portion may be synchronized with network communication, such as the sending or receiving of variable values or other data, in various ways.

As noted above, in one embodiment the graphical programming development environment may provide a variable abstraction framework that allows the user to configure the timing of when variable values are transferred during the network cycle. This variable abstraction may allow the configuration of the data exchange timing to be abstracted from the graphical programs themselves. For example, the timing of data exchange may be changed by re-configuring the variables to assign them to different time slots. However, since the graphical programs are timed based on various network events, such as when the variables are sent or received, the graphical programs themselves may not need to be changed when the timing of data exchange is changed.

As described above, in one embodiment graphical programs executing on different computer systems may exchange data through the use of variables, where the variables may be associated with or assigned to time slots of the network 85. According to one embodiment of a method enabling graphical programs to exchange data, a first variable may be assigned to a first time slot in a network cycle of the network 85. A first graphical program may be configured to write data to the first variable. A second graphical program may be configured to read data from the first variable.

The first graphical program may be executed on a first computer system, where executing the first graphical program comprises writing data to the first variable. Writing data to the first variable may cause the data to be delivered over a network to a second computer system when the first time slot occurs.

The second graphical program may be executed on the second computer system, where executing the second graphical program comprises reading from the first variable the data sent from the first computer system.

FIGS. 22-27 illustrate an exemplary configuration tool allowing a user to create and configure various objects for a closed network 85, also referred to herein as a time-triggered network. The configuration tool may comprise various graphical user interface (GUI) panels allowing the user to configure network properties, time-triggered variables, timing sources based on variables, etc.

Figure 22:
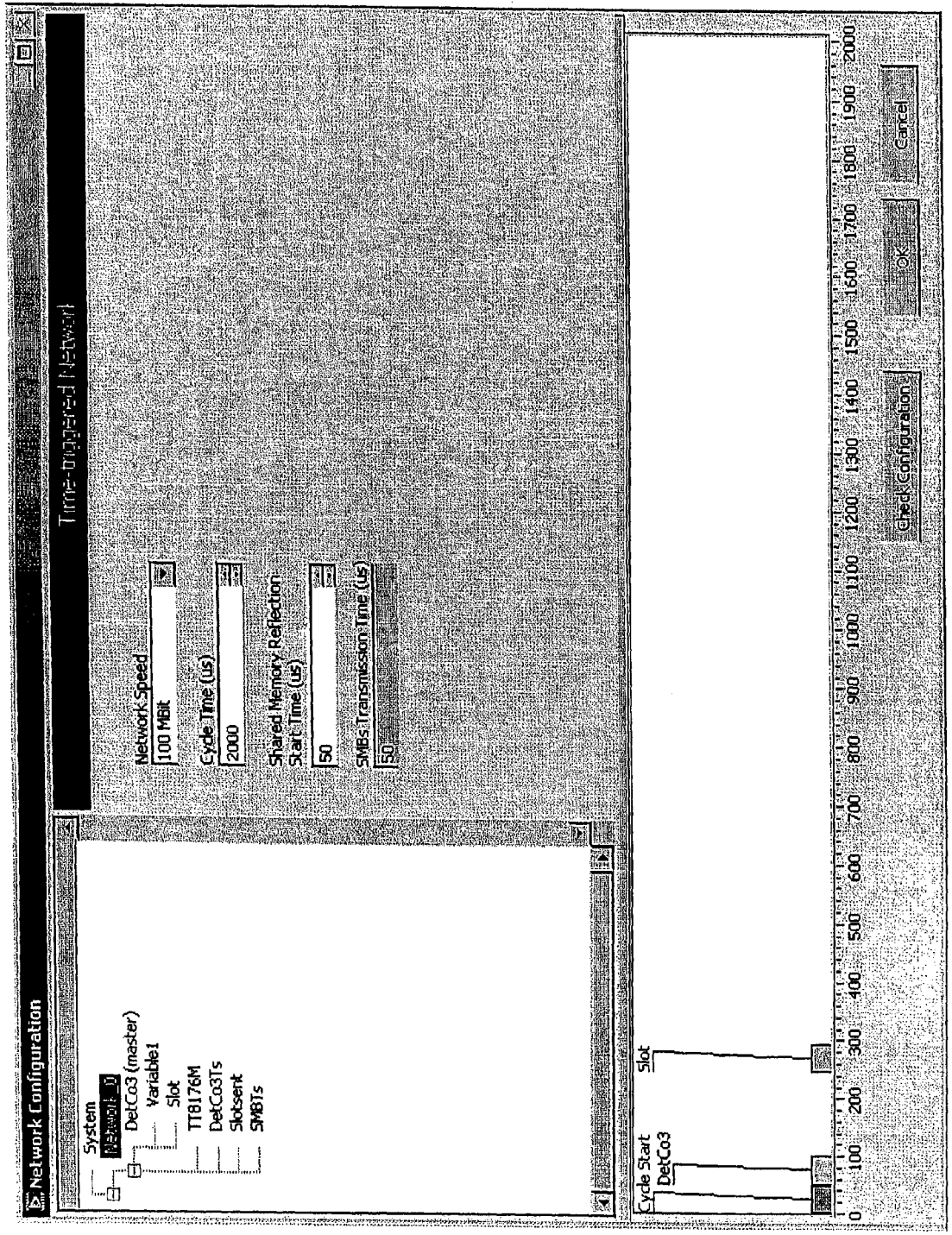
FIG. 22 illustrates an exemplary graphical user interface (GUI) allowing a user to configure properties of a time-triggered network.

As shown in the upper left pane of the GUI of FIG. 22, a hierarchical view of various objects is presented. For example, a network object represents a network configuration and has several sub-objects representing objects such as nodes coupled to the network, variables that have been configured to be sent during a cycle of the network, timing sources that can be used to control the timing of timed loops in graphical programs, etc. The user may select a desired object in the hierarchical view to cause properties of the object to be displayed in the upper right pane. The user can then configure the properties of the object with desired settings.

In FIG. 22 the user has selected a network object. Configuration information for the network is displayed in the upper right. As shown, the graphical user interface allows the user to the network speed, specify a desired cycle time (cycle length), and specify a time when shared memory blocks begin are sent over the network, e.g., utilizing reflective memory. Each node may have one shared memory block. In one embodiment, shared memory blocks for all the nodes on the network are sent adjacently to each other. For example, as soon as the shared memory block for one node finishes transmission, the shared memory block for another node begins transmission. Thus the user may specify a single start time for shared memory block reflection to begin. In another embodiment the shared memory blocks for different nodes may not necessarily be transmitted adjacently to each other. Thus the user may specify a desired start time for transmitting the shared memory block of each node. The GUI may also indicate to the user the transmission time required to transmit the shared memory blocks.

Figure 23:
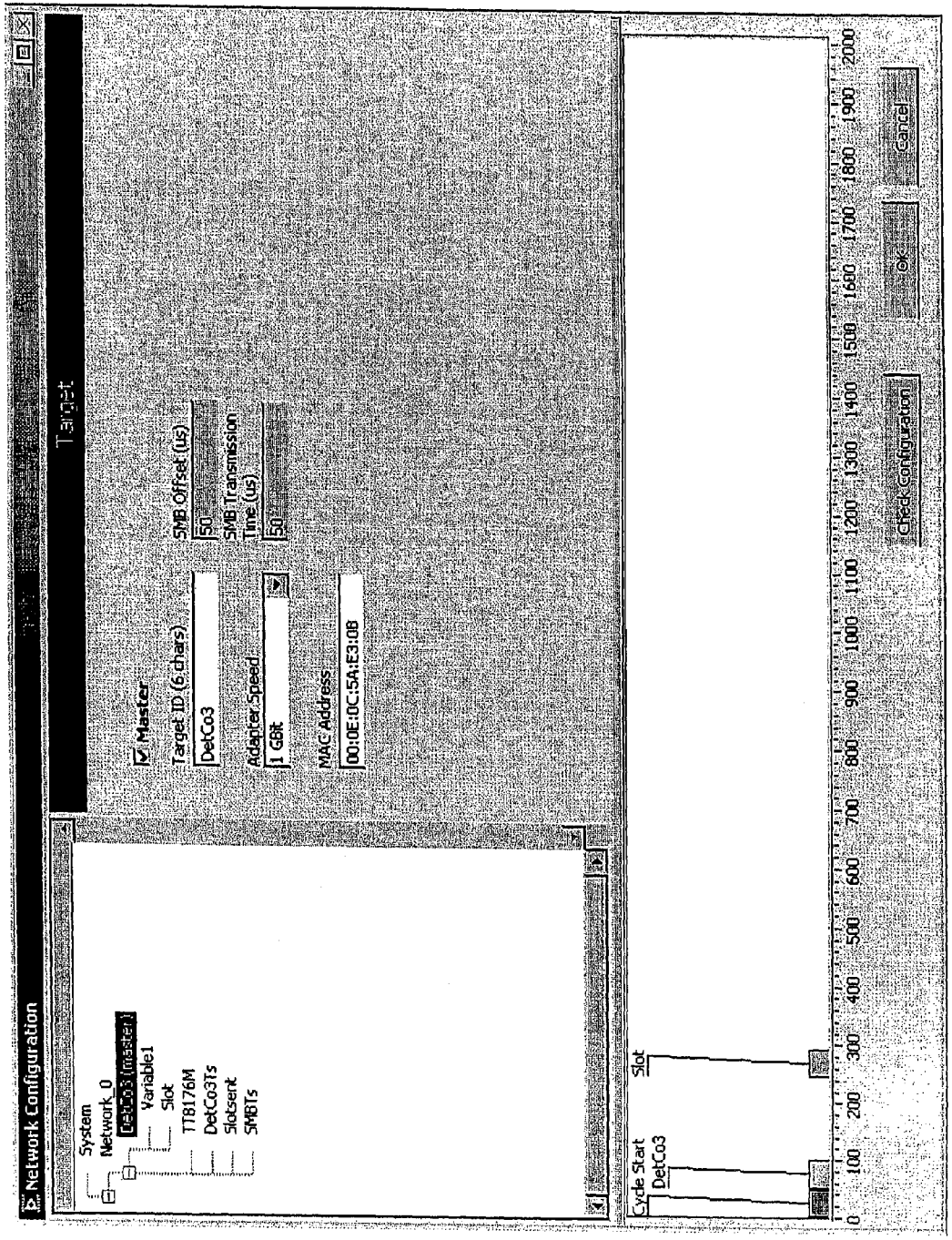

In FIG. 23 the user has selected a node (computer system) named DetCo3. The upper right pane displays various properties for the node, such as the network adapter speed, MAC address, etc. The GUI also indicates when the shared memory block for the node is configured to be transmitted and the transmission time necessary.

Figure 25:
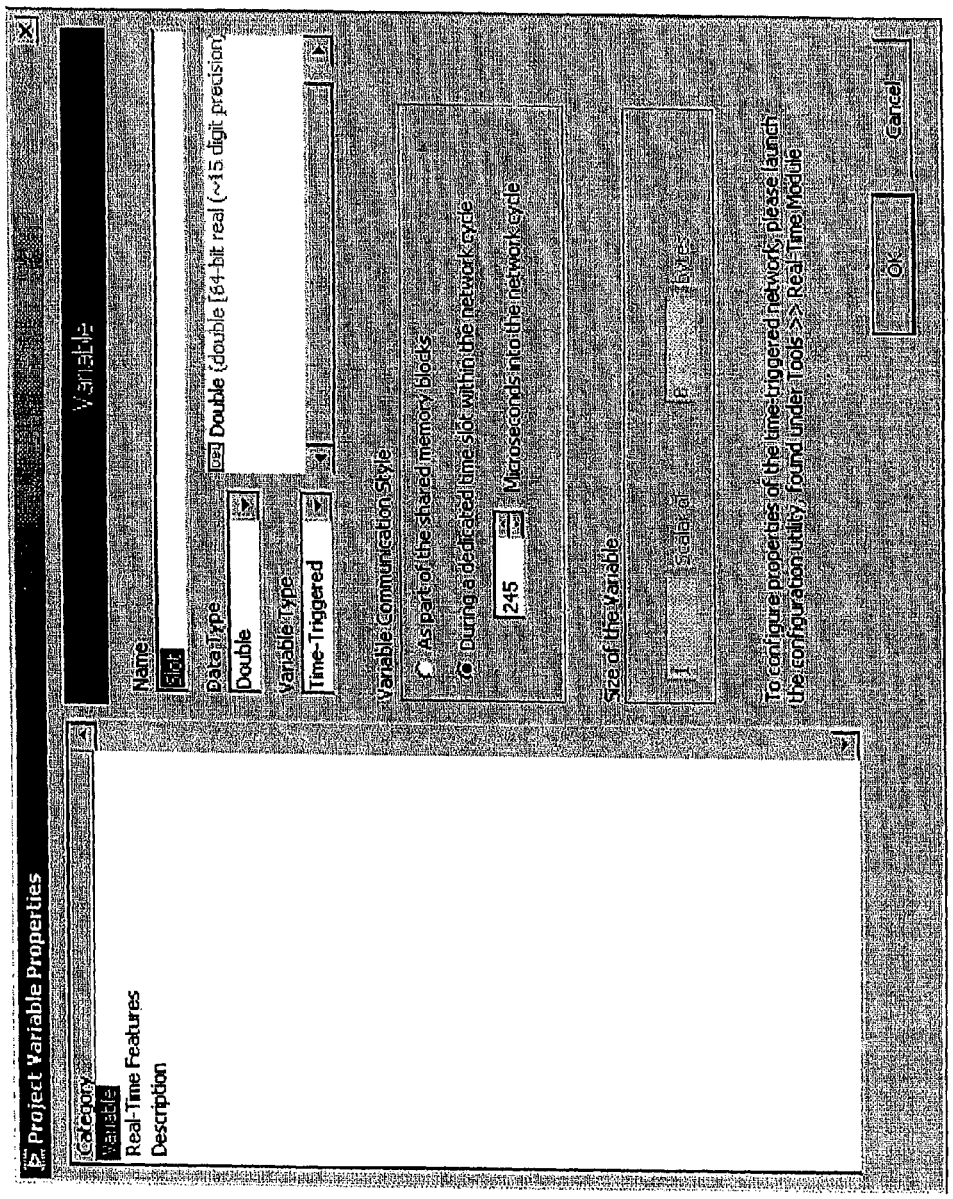

FIG. 25 illustrates an exemplary GUI for creating and configuring a variable to be used in data exchange between graphical programs on different computer systems. The user has selected that the variable comprises a time-triggered variable, meaning that the variable data may be sent from one graphical program to one or more other graphical programs in a time-triggered or deterministic manner. A time-triggered variable is also referred to herein as a deterministic shared variable.

As shown in FIG. 25, the user may specify a name for the slot-based variable. In this example, the name of the variable is "Slot". The user may also specify a data type for the variable. The user may also specify whether the time-triggered variable is a slot-based variable or a shared memory block variable. A slot-based variable may be assigned to a particular time slot, so that the variable value (and only that variable value) is sent over the network at that time slot. In contrast, multiple variables may be assigned to the shared memory block for a given node. The shared memory block may be assigned to a time slot so that the values of the variables assigned to the shared memory block begin to be sent over the network at that time. However, the system does not guarantee exactly where within the shared memory block the variable values will be sent.

Thus, slot-based variables may require more communication overhead, due to message headers being sent, etc., but the exact time at which they are sent is known. Also, slot-based variables may allow communication back and forth between sender and receiver nodes multiple times within one network cycle. In contrast, all the shared memory block variables for a given node may be sent atomically only once during each cycle.

Figure 26:
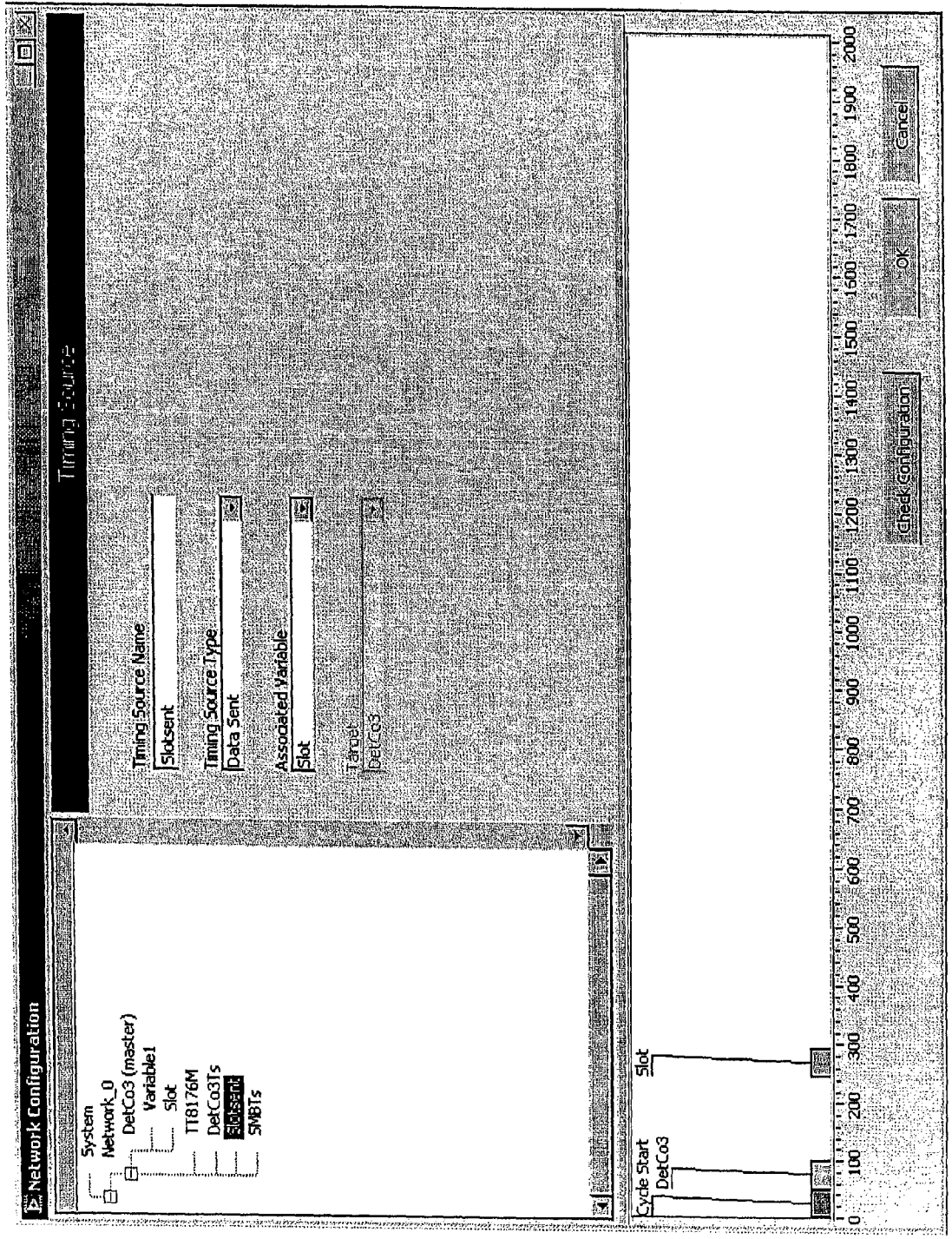

In the example shown in FIG. 25, the user has chosen to make the variable a slot-based variable. Thus, the variable has a dedicated time slot within the network cycle for the variable value to be transmitted over the network. The user can set the time slot to whatever time slot is desired. In this example, the user has chosen to assign the variable to a time slot 245 microseconds into the network cycle. Variables that have been created and configured are listed in the hierarchical view. For example, the hierarchical view of FIG. 26 lists two variables, the slot-based variable named "Slot" described above, and a shared memory block variable named "Variable1". The hierarchical view of FIG. 26 also lists timing sources that have been configured, where the timing sources may be used to control the timing of timed loops in graphical programs. For example, a timing source named "Slotsent" is listed, along with a timing source named "DetCo3Ts". The "Slotsent" timing source is associated with the variable "Slot", and the "DetCo3Ts" timing source is associated with the variable "Variable1". In FIG. 26 the user has selected the "Slotsent" timing source so that its properties are listed in the panel on the upper right. The user may select a timing source type for the timing source. The timing source type specifies what types of network communication associated with the "Slot" variable cause the timing source to generate an event (or tick or pulse). In the example shown, the user has selected a "Data Sent" timing source type to indicate that the timing source generates an event when the "Slot" variable value is sent over the network.

Figure 24:
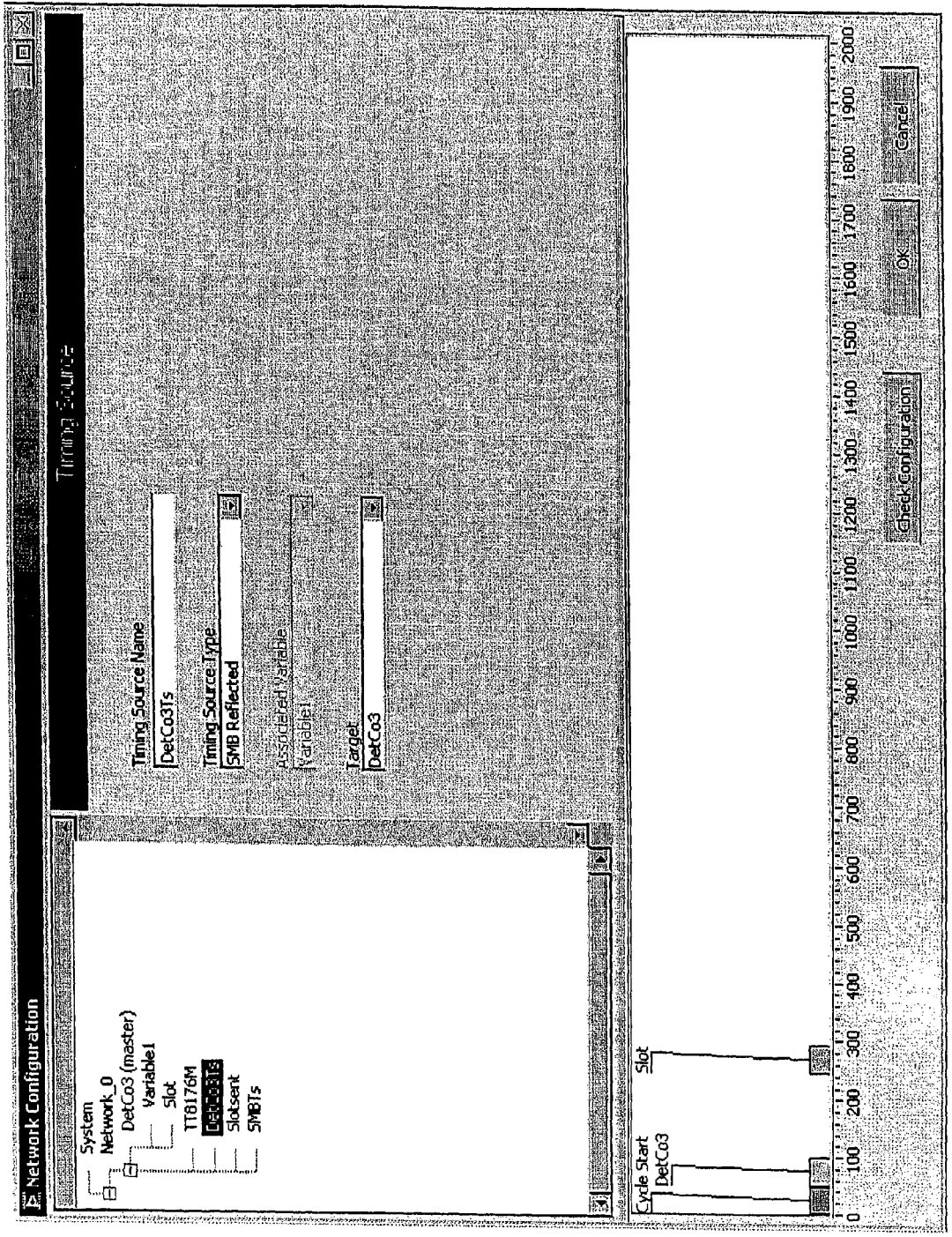

In FIG. 24 the user has selected the "DetCo3Ts" shared memory block timing source so that its properties are listed in the panel on the upper right. The user may select a timing source type for the shared memory block timing source. In this example the user has selected a type of "SMB reflected".

Figure 27:
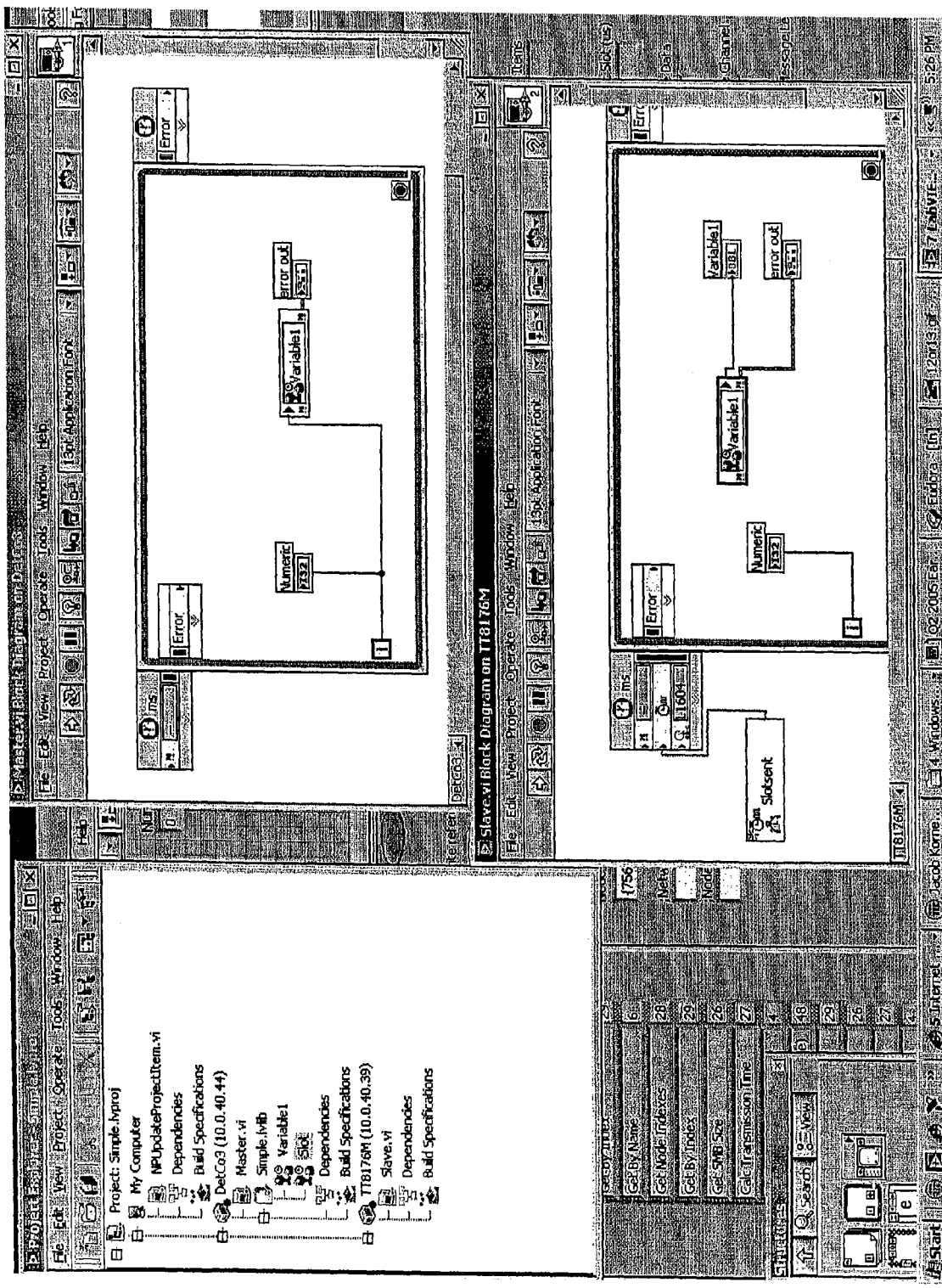

Once a variable and its associated timing source have been configured, the user may utilize the variable to communicate data from one graphical program to another, as shown in FIG. 27.

In one embodiment the configuration tool described above may include various features for aiding the user in creating the desired schedule of variable transmissions during the network cycle. FIGS. 22-24 and 26 illustrate a timeline at the bottom of the GUI where each variable is shown as an icon located at the time when the variable is transmitted over the network. In one embodiment icons for different types of transmissions may be displayed in different colors, e.g., shared memory blocks in blue, cycle start packet in green, and slot-based variables in yellow.

In one embodiment the user can specify the schedule graphically by dragging icons around in the timeline. For example, in FIG. 22 the user can change the "Slot" variable to be transmitted 700 microseconds into the cycle by clicking and dragging the corresponding icon to the 700 microsecond mark on the timeline. The user may also adjust the transmission start times textually. For example, the user can click on the "Slot" icon to display the properties of the "Slot" variable and may then enter a value indicating the desired time slot.

As described above, variable communication should be scheduled so that there are no message conflicts on the network. If any variables overlap in their transmissions, the configuration tool may detect the conflict and indicate a warning or error condition. Conflicts may be detected between different slot-based variables, between slot-based variables and shared memory blocks, between variables and the cycle start packet, etc. In one embodiment the configuration tool may be operable to automatically resolve the conflicts if any are detected. For example, the tool may automatically re-schedule a slot-based variable to a new time slot to eliminate a conflict.

For each variable the user may specify a data type which inherently specifies a size of the variable, or the user may explicitly specify a size (e.g., number of bytes) for the variable. The width of the icon displayed for a variable may visually indicate the amount of time necessary to transmit the variable value. The transmission time may be calculated based on the size of the variable and the speed of the network. If the user changes a variable size or data type then the configuration tool may visually indicate the new variable size by adjusting the width of the corresponding icons displayed in the timeline. The width of the icon representing the shared memory block for a particular node may be re-sized as new shared memory block variables are added on the node, or as the node's shared memory block variables are re-sized.

As noted above, the transmission time for a variable, i.e., the time that elapses between the time when data for the variable begins to be sent and the time when all the data for the variable has been sent, depends on the speed of the network. For example, the icon for a variable may be displayed with a first width if the network speed is set to 100 MBit. If the user then re-configures the network to specify a new speed, e.g., 1 GBit, then the width of the variable icon may be automatically adjusted to reflect the new transmission time required.

Figure 28:
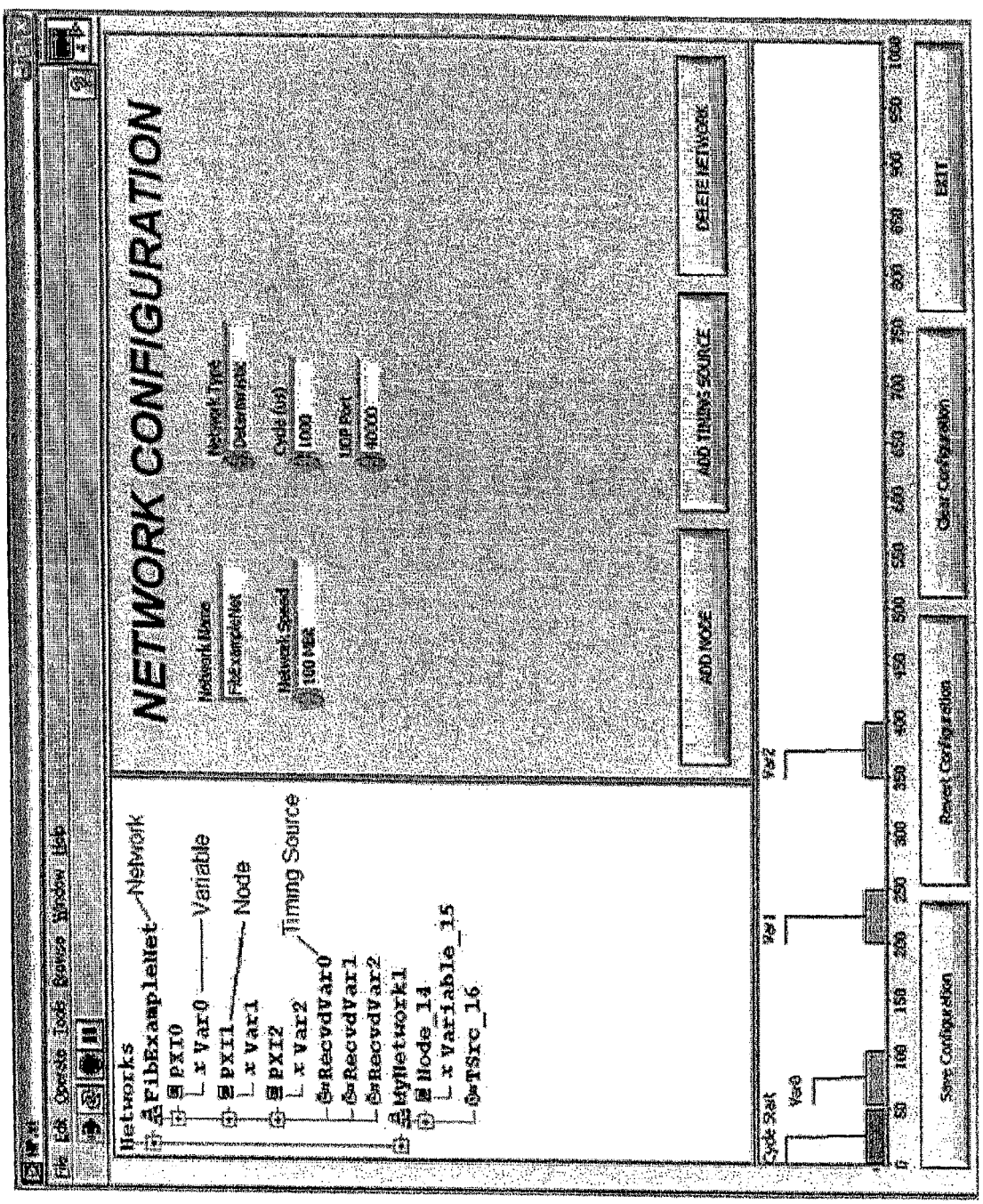
FIG. 28 illustrates another exemplary GUI for a configuration tool such as shown in FIGS. 22-27.

FIG. 28 illustrates another exemplary GUI for a configuration tool such as described above. The following describes how a user may utilize the configuration tool to configure multiple graphical programs to exchange data according to one embodiment.

The user may need to specify some network-wide attributes, such as: Network Name, Network Speed (100 MBit or 1 GBit), Network type (deterministic or not). If the user chooses deterministic for the network type then he will have some more attributes to configure for the network, such as: Cycle time (us), Shared Memory Block's (SMB)'s Transmission Time (us), UDP Port, etc.

Once these network attributes have been specified, the user can configure the nodes on the network. A node may comprise the network card (and thus the carrying PXI or other computer system) that the user installed to be exclusively used for the closed network. The user will need to specify the following node attributes: Node Name, Node ID, Adapter Speed, MAC Address. If the user chose deterministic for the network type, the user will also have these attributes to specify for the node: shared memory block (SMB) Offset (us), shared memory block transmission time (us), Master node? (Boolean value).

Each variable may be assigned to or deployed on a node so that that node is the only one which can write to it. Variables may have the following attributes that need to be configured: Name, shared memory block Variable? (Boolean value), max size. If the variable is not type a shared memory block variable then it is a slot-based variable, and has the following additional attributes: Offset (us)—this is the "slot" in time for the variable; Transmission Time (us)—this is time necessary to transmit the variable data. It is calculated based on size (bytes) of the variable and network speed.

The user also needs to be able to create and configure timing sources that they can then use in their graphical programs to synchronize graphical code execution with various network events. In one embodiment, timing sources are network wide and can be used on any node on the network. For a given network the user can create and configure any number of any of these types of timing sources:
Data Received—fires every time a packet is received for a variable. Associated properties are:
    Name—user sees/selects this name when creating the graphical program
    Variable—the variable for which data is received, causing the timing source to fire
Data Sent—fires every time a packet is sent or received for a variable. Associated properties are:
    Name—user sees/selects this name when creating the graphical program
    Variable—the variable for which data is sent, thus causing the timing source to fire
Channel Start—fires every time a variable's designated time slot begins
    Name—user sees/selects this name when creating the graphical program
    Variable—the variable whose time slot began, thus causing the timing source to fire
Channel Stop—fires every time a variable's designated time slot ends.
    Name—user sees/selects this name when creating the graphical program
    Variable—the variable whose time slot ended, thus causing the timing source to fire
SMB reflected—fires when a particular node is done reflecting its shared memory
    Name—same as above
    Node—the node whose shared memory block has been reflected
SMBs reflected—fires when the last shared memory block in the cycle has been reflected
    Name—same as above The user may assign a variable, also referred to as a distributed shared variable (DSV) to a computing device by dragging the DSV from the source view to underneath a computing device item that is in the System Definition tree. This establishes the relationship where that computing device will be the node that the DSV belongs to and that node is the only one who can write to the variable.

FIG. 28 illustrates a GUI that displays a view of networks, nodes, DSVs and timing sources. The user can select any of these tree items and the right hand pane in response displays the attributes (both configurable and read-only) for that item. With this GUI the user can:
In this dialog box, the user can:
    Create a deterministic network by right-clicking on "Networks" and choosing "Add Network."
    Configure network wide attributes for a deterministic network by selecting the deterministic network item and adjusting the attributes in the right hand pane.
    Add nodes to a network by clicking on the tree item for the network and choosing "Add Node." The user will be prompted with a list of existing nodes when they choose to add a node.
    Add timing sources to a network by right clicking on the tree item for that network and choosing "Add Timing Source."
    Configure the nodes and timing sources by selecting their tree items and adjusting the attribute in the right hand pane.
    Configure deterministic networking specific attributes (slot, max size, etc.) of the DSVs by selecting the tree item and adjusting the attributes in the right hand pane.
    Graphically adjust the offsets of all the slot based DSVs on a given network. E.g. in FIG. 28 the user can slide around Var0, Var1 and Var2 in the cycle span.

Figure 29:
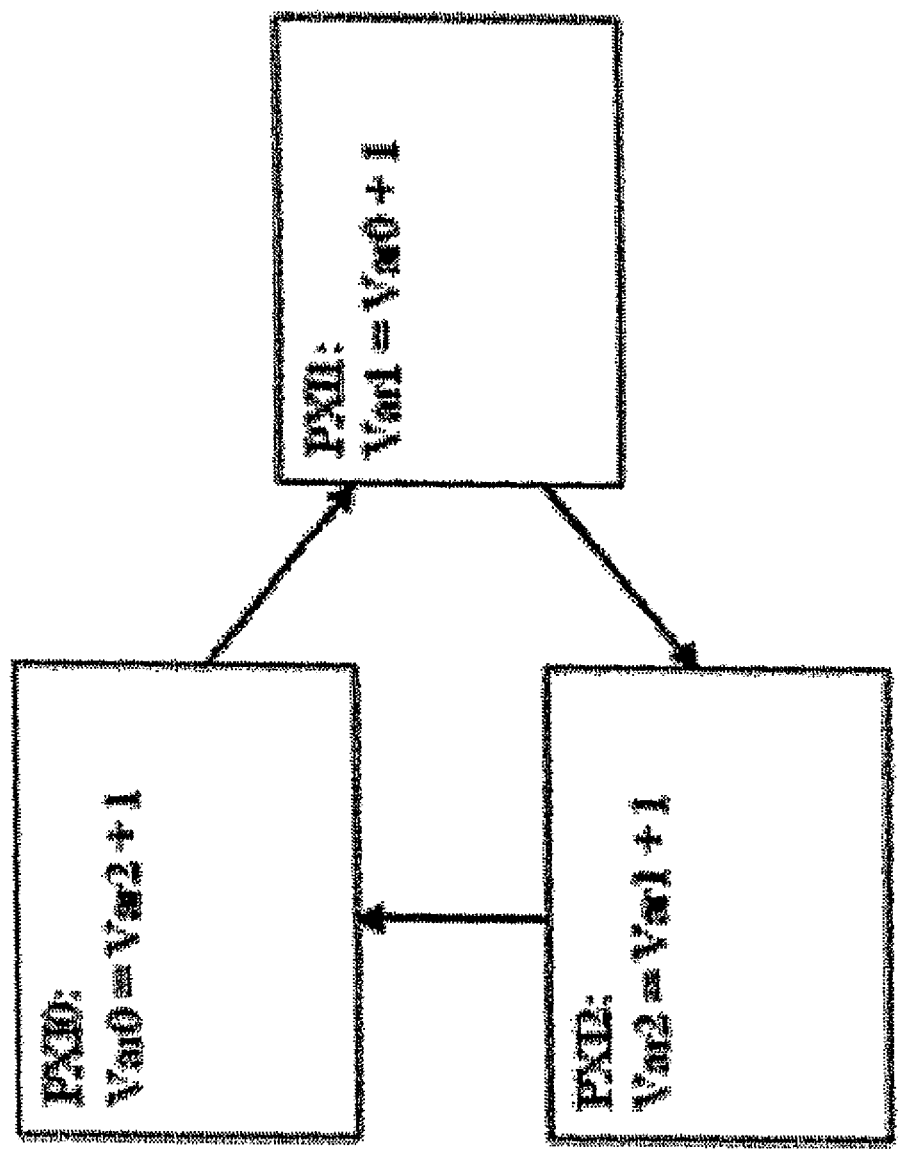
FIG. 29 illustrates an example of using three distributed shared variables to exchange data among three graphical programs.

FIG. 29 illustrates an example of using three distributed shared variables to exchange data among three graphical programs. An exemplary system configuration is:
    3 LV RT PXI nodes: PXI0, PXI1 and PXI2
    Each with extra 100 Mbps NIC (on a closed network)—MAC addresses are MAC0, MAC1 and MAC2
    Each with a deployed DSV: Var0 on PXI0, Var1 on PXI1, and Var2 on PXI2.
    Deterministic network cycle time is 1000 us
    Each DSV is a 4 byte integer and is slot based
    For each DSV there is a "data received" timing source.
    Each node reads the DSV from the previous node, adds 1, and then writes out the result to its own DSV In one embodiment the user may perform the following steps to configure the application:
    Create the three PXIs in the System Definition tree.
    Create the three variables.
    Drag each of the three variables to its appropriate PXI (this may have happened already if they were created directly under PXIs)
    Set variables' feature pack to "deterministic" (this may have happened at the same time as creation)
    Bring up deterministic network configuration
    In deterministic network properties dialog configure network wide properties
    In deterministic network properties dialog add the 3 PXI nodes (variables will automatically be populated under nodes if they have already been dragged to underneath a PXI). The user will be given a list of actual PXI nodes from which to choose.

In deterministic network properties dialog browse to each variable in network provider properties tree and do configuration (make slot based, choose a slot—in this example the slots for the variables are spaced 100 microseconds apart).

In deterministic network properties dialog create three "data received" timing sources (one assigned to each variable)

Create the three graphical programs. Wake up on the appropriate timing source to do the calculation.

The user may be able to perform the above steps in various orders.

FIG. 30

Figure 30:
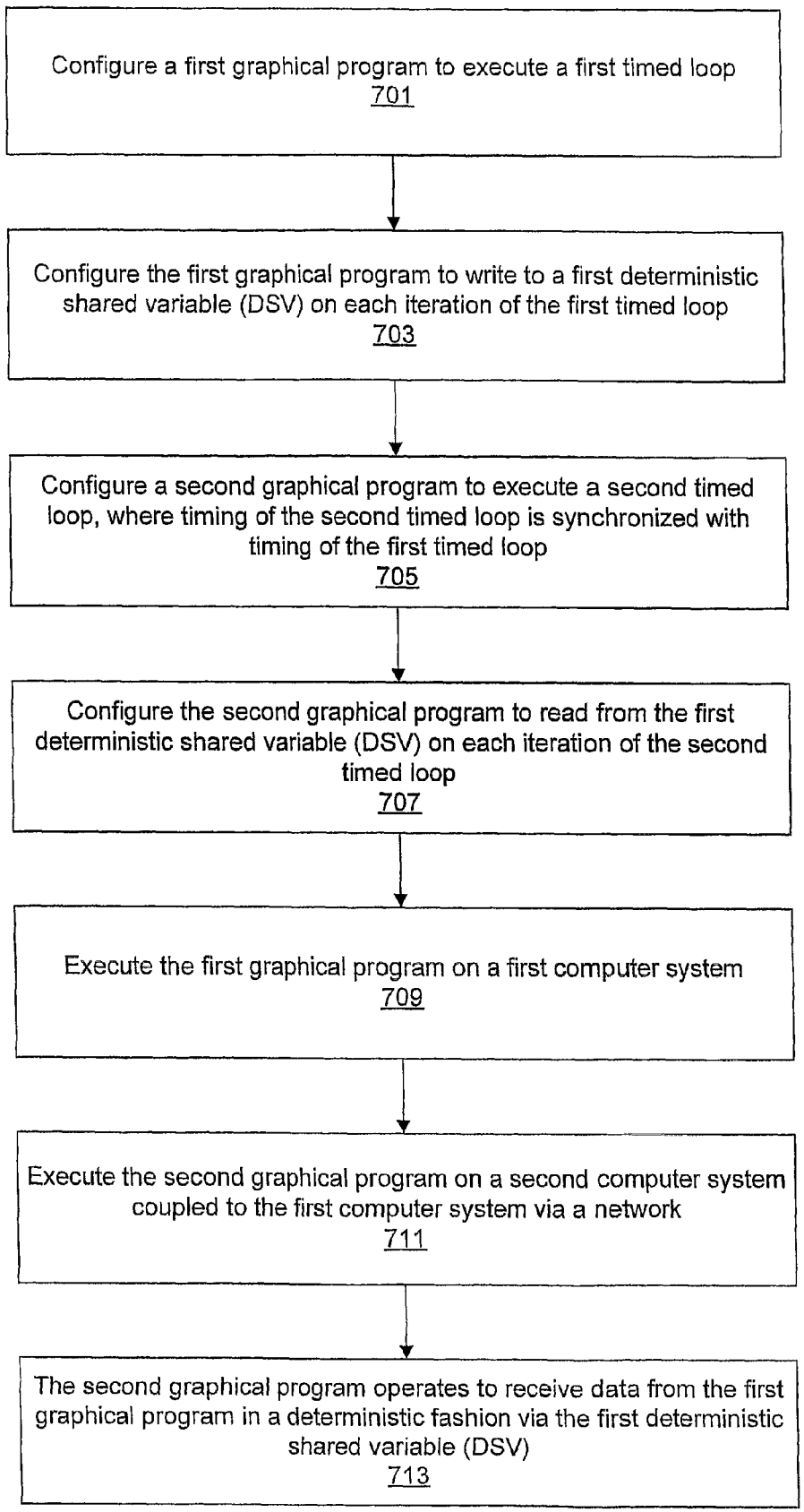
FIG. 30 is a flowchart diagram illustrating one embodiment of a method for enabling two graphical programs that execute on different computer systems to share data in a deterministic fashion.

FIG. 30 is a flowchart diagram illustrating one embodiment of a method for enabling two graphical programs that execute on different computer systems to share data in a deterministic fashion. As described below, a first graphical program may provide data to a second graphical program through a deterministic shared variable (DSV). It is noted that FIG. 30 illustrates a representative embodiment, and alternative embodiments are contemplated. Also, various elements may be combined, omitted, or performed in different orders.

As shown in 701, a first graphical program may be configured to execute a first timed loop. For example, the user may include the first timed loop in the first graphical program and configure the first timed loop to execute according to an execution period P, as described above. The user may configure the first timed loop to perform first functionality on each iteration of the first timed loop, e.g., such that the first functionality is periodically performed with timing specified by the execution period P. In particular, the user may configure the first graphical program to write to a first deterministic shared variable on each iteration of the first timed loop, as indicated in 703.

As used herein, a deterministic shared variable (DSV) may comprise a variable used to share data between two (or more) programs, wherein the value of the DSV is updated deterministically, e.g., updated periodically according to a known period. In the embodiment shown in FIG. 30, the value of the first DSV is updated according to the execution period P of the first timed loop. For example, if the first timed loop executes with an execution period of 20 ms then the value of the first DSV may be deterministically updated every 20 ms.

In 705 a second graphical program may be configured to execute a second timed loop, where the timing of the second timed loop is synchronized with the timing of the first timed loop. The timing of the second timed loop may be synchronized with the timing of the first timed loop by configuring the second timed loop to have the same execution period as the first timed loop, i.e., the execution period P. For example, if the first timed loop is configured to execute with an execution period of 20 ms then the second timed loop may also be configured to execute with an execution period of 20 ms. As described above, a timed loop may also be configured with a particular timing source. In one embodiment, synchronizing the timing of the second timed loop with the timing of the first timed loop may comprise configuring the second timed loop with the same timing source as the first timed loop. However, it may be useful to configure the second timed loop with a different offset than the first timed loop, as described in more detail below. Thus, the first timed loop and the second timed loop may be synchronized with respect to timing source and execution period, but may execute with different phases, i.e., may execute with different offsets with respect to the start of the timing source.

The user may configure the second timed loop to perform second functionality on each iteration of the second timed loop. In particular, the user may configure the second graphical program to read from the first DSV on each iteration of the second timed loop, as indicated in 707. In various embodiments, the user may perform any of various actions to configure the first graphical program to write to the first DSV and to configure the second graphical program to read from the first DSV, depending on how deterministic shared variables are implemented or how they are represented in the graphical program. Exemplary embodiments of graphical programs that include graphical source code for writing to and reading from DSV's are described below.

Thus, the first graphical program may be configured to write data to the first DSV in a deterministic fashion, e.g., according to a precisely timed period (the execution period P), and the second graphical program may be configured to read data from the first DSV in a deterministic fashion, e.g., according to the same precisely timed period. The graphical programming development environment may support a communication infrastructure operable to ensure that data updates for the first DSV arrive at the second graphical program in a deterministic fashion to support such deterministic sharing of data between the two graphical programs, as described in more detail below.

In 709, execution of the first graphical program may be started on a first computer system. In 711, execution of the second graphical program may be started on a second computer system, where the second computer system is coupled to the first computer system via a network. In various embodiments the second computer system may be coupled to the first computer system via any kind of network. In one embodiment the network may comprise a deterministic network, as described below.

As indicated in 713, the second graphical program may execute to receive data from the first graphical program in a deterministic fashion via the first DSV. More specifically, the second graphical program may receive data updates of the first DSV from the first graphical program at fixed intervals determined by the execution period of the first and second timed loops. As described above, at each iteration of the first timed loop, the first graphical program may write to, i.e., may update, the value of the first DSV. Since the second timed loop is synchronized with the first timed loop, for each iteration of the first timed loop, there is a corresponding iteration of the second timed loop. Thus, each iteration of the second timed loop may read the value that was written to the first DSV by the corresponding iteration of the first timed loop in the first graphical program.

As noted above, the phase of the second timed loop may be offset from the phase of the first timed loop by configuring the second timed loop with a different offset value than the first timed loop. For example, if time T represents the time at which a given iteration of the first timed loop begins execution, then execution of the corresponding iteration of the second timed loop may begin at time T+Offset, where "Offset" represents the offset of the second timed loop. This difference in phases between the two timed loops may allow the data update of the first DSV performed by a given iteration of the first timed loop to arrive at the second graphical program in time to be read by the corresponding iteration of the second timed loop.

The data updates of the first DSV may be received via the network that couples the second computer system to the first computer system. As noted above, the graphical programming development environment may support a communication infrastructure operable to deterministically provide the data updates of the first DSV to the second graphical program. More specifically, the system may ensure that the data updates of the first DSV arrive at the second graphical program at time intervals defined by the execution period of the first and second timed loops. For example, if the execution period of the timed loops is 20 ms then the data updates of the first DSV may arrive at the second graphical program every 20 ms.

As described above, the first graphical program performs the first timed loop to write to the first DSV. A deterministic communication engine supported by the graphical programming development environment ensures that each data update of the first DSV arrives at the second graphical program deterministically according to the execution period of the timed loops.

In various embodiments the first DSV may represent data of any type and having any size. Also, the first graphical program and the second graphical program may share data using any number of DSV's. For example, in addition to the first DSV, the first graphical program may also be configured to write data to a second DSV on each iteration of the first timed loop, and the second graphical program may be configured to read data from the second DSV on each iteration of the second timed loop.

In the embodiment described above there is one-way deterministic communication from the first graphical program to the second graphical program. In another embodiment the graphical programs may perform two-way deterministic communication, i.e., each graphical program may provide data to the other graphical program in a deterministic fashion. For example, the first graphical program may write to a first DSV and read from a second DSV on each iteration of the first timed loop, and the second graphical program reads from the first DSV and writes to the second DSV on each iteration of the second timed loop.

In another embodiment, the first graphical program and the second graphical program may each include multiple timed loops. This may allow the graphical programs to communicate through the user of multiple DSV's that are deterministically updated at different rates. For example, the first graphical program may perform a first timed loop to write to a first DSV, and the second graphical program may perform a second timed loop to read from the first DSV, where the first timed loop and the second timed loop are both configured to execute according to an execution period P1. The second graphical program may also perform a third timed loop to write to a second DSV, and the first graphical program may perform a fourth timed loop to read from the second DSV, where the third timed loop and the fourth timed loop are both configured to execute according to an execution period P2. Thus, the second graphical program may receive data updates from the first graphical program at a deterministic rate determined by the execution period P1, and the first graphical program may receive data updates from the second graphical program at a deterministic rate determined by the execution period P2.

It is noted that any number of graphical programs may communicate through the use of DSV's in the manner described above. For example, a first graphical program may perform a first timed loop to write to a first DSV, and each of a plurality of other graphical programs may perform a timed loop to deterministically receive the data updates from the first DSV. The timed loop in each of the other graphical programs may be synchronized with the first timed loop in the first graphical program. The communication infrastructure may ensure that each graphical program deterministically receives the data updates for the first DSV in synchronization with the period of the timed loops.

As described above, the graphical programming development environment may support a deterministic communication infrastructure or engine that ensures that data updates for a DSV arrive at the target graphical program(s) in a deterministic fashion. In one embodiment, the value of a DSV data may be passed from the graphical program that writes to the DSV to the graphical program that reads from the DSV via a deterministic network or time-triggered network.

The deterministic network may be configured with a cycle time. The cycle time is the period between successive cycle start packages sent out by a master node (computer system) on the network. The deterministic network may be implemented so that this period is deterministic, i.e., so that the cycle start packages are sent out deterministically according to a known period.

Each computer system on the network (referred to as a "node") may be configured with a timing source that generates a tick at each cycle-start time, also referred to as the "network timing source". Timed loops in graphical programs that execute on the computer systems on the network may be configured to use the network timing source as their timing source. Thus, the network timing source may control the timing of the timed loops. For example, if multiple timed loops are each configured with an execution period of N, then an iteration of each timed loop may be triggered at each Nth tick of the network timing source. However, as described above, the timed loops may be configured with different offset values.

In various embodiments of the graphical programming development environment, a graphical program may be configured to utilize a deterministic shared variable (DSV) such as described above using any of various techniques. In one embodiment, a deterministic shared variable may be a specific sub-type of a more general concept referred to herein as simply a "shared variable". A shared variable may comprise a variable for passing data between graphical programs, where it is not possible to use a data flow wire to indicate the data flow. The graphical programs may or may not execute on the same computer system.

In one embodiment the graphical programming development environment may support additional kinds of shared variables in addition to deterministic shared variables. For example, in addition to deterministic shared variables, the graphical programming development environment may also support network shared variables. A network shared variable may implement an asynchronous publish and subscribe mechanism for exchanging data between computing nodes. The shared variable concept may also be general enough to be used with other communication mechanisms besides publish and subscribe, such as host-interface communication between a graphical program executing on an FPGA device and a graphical program executing on a host computer.

In one embodiment, each kind of shared variable may have its own communication engine responsible for implementing the behavior of shared variables of that kind. For example, as described above, the graphical programming development environment may support a communication infrastructure that implements the behavior of deterministic shared variables. This communication infrastructure is also referred to herein as the "deterministic communication engine". Other kinds of shared variables may have their own engines. For example, communication using network shared variables may be managed by a separate shared variable engine.

In one embodiment, when a user creates a shared variable, he may be able to choose the appropriate communication mechanism or engine from among several available communication mechanisms, or he may specify the kind of shared variable he wants to create. In various embodiments the graphical programming development environment may present any of various kinds of user interfaces to allow the user to create or configure shared variables of different kinds. In one embodiment, common configuration dialogs or windows may be used where possible to configure different kinds of shared variables. For example, different kinds of shared variables may share certain configurable properties in common, and the user may use the same or similar configuration dialogs to configure shared variables of these different kinds. Each kind of shared variable may also have certain properties that are specific to that kind of shared variable. Thus, although the look and feel of the configuration dialogs or windows may be the same for different kinds of shared variables where possible, the configuration dialog(s) for a particular kind of shared variable may also allow the user to set the properties that are specific to that kind of shared variable.

In one embodiment, a DSV may be partially configured through a general shared variable configuration dialog. The shared variable configuration dialog may also have a dedicated tab or sub-dialog for configuring properties specific to DSV's.

In one embodiment, the graphical programming development environment may support two kinds of DSVs: block-based and slot-based. A configuration dialog may allow the user to check a check box to indicate whether a slot-based DSV is desired. Block-based DSVs are collected and transmitted in a single message, once per network cycle. Slot-based DSVs are assigned dedicated slots during the cycle and can thus be used to send distinct values at different times within a cycle. Slot-based variables may entail the additional overhead of sending a unique message for each value. The time to send a single byte message may be indistinguishable from sending 1000 bytes.

In one embodiment, the user may configure properties for a DSV such as:
  Variable name (This property may also be configured for other kinds of shared variables.)
  Data type (This property may also be configured for other kinds of shared variables.)
  Number of bytes (up to a maximum, e.g., 1500 bytes) to allocate for a variable with dynamic size (Arrays and Strings)
  Name of the deterministic network adaptor (The user may choose "default" for mapping to the default deterministic network on the node or get the value.)
  Designated communication slot for slot-based DSVs
  Type of Timing source created for slot-based DSV update (and its name)

In one embodiment the graphical programming development environment may restrict the terms of where and how DSV's can be used. In one embodiment, DSV usage may be governed by the following rules:
  A DSV can only be deployed to a target that has a configured deterministic network card
  A write reference to a DSV is only allowed on the node that the DSV has been deployed to
  A read reference to a DSV is only allowed on the same deterministic network that it has been deployed to
  Any of various data types may be supported for DSV's.

Deterministic shared variables (DSV's) such as described above may be useful for implementing many different kinds of applications that require deterministic communication between graphical programs. As one example, DSV's may be used in a real-time distributed control application. In a real-time distributed control application, communication of data between distributed real-time computing nodes is an integral part of the control loop. This means that any jitter induced by the network results in jitter for the control loop. Thus, jitter in the control loop may be eliminated or greatly reduced by using DSV's, where the DSV values are passed between graphical programs via a deterministic network, as described above.

As another example, DSV's may be used in a distributed processing application or a distributed simulation application. In a distributed processing (or simulation) application, computation may be distributed across multiple computing nodes. For example, a hardware-in-the-loop (HIL) simulation that has to run in real-time may need to be distributed across multiple nodes because a high-fidelity model may require too much computation to run on a single node to complete a time step of the model within the period of the loop. Thus, a model for the HIL simulation may be distributed across multiple nodes, and DSV's may be used to exchange relevant model information between the nodes at each step of the simulation.

Deterministic Network

In various embodiments, the deterministic network that is used in the system described above may have any of various implementations. Characteristics of different deterministic networks may vary. However, many deterministic network implementations share the following characteristics:
  The networks are typically isolated, or connected through gateways that tightly control the incoming traffic to the network. All nodes on the network either participate directly in the deterministic communication, or they respect the deterministic protocol. These nodes are expected to run a real-time operating system, or at least have strong temporal protection from jitter induced by the OS.
  The network operates in cycles of fixed duration or user-configurable duration.
  Messages can be transmitted either synchronously or asynchronously.
  Each synchronous message uses dedicated and pre-allocated bandwidth (or scheduled slots). This results in deterministic (time-triggered) delivery of data. If the data gets corrupted during transit, the message will not be retransmitted at the network layer. Each synchronous message is sent on every cycle of the network, containing (potentially) new data.
  Asynchronous messages are sent using preallocated bandwidth (or scheduled slots) that is pooled together for all asynchronous communication between nodes on the network. A fairness policy may be applied to make sure that all nodes eventually get to transmit their asynchronous messages. Asynchronous messages will be retransmitted in the case of data corruption during transit.
  The network has a mechanism that allows a node to reserve bandwidth or slots for each synchronous communication, if the network has free capacity for the communication. At design time it is possible to construct a global schedule for the network, as well as timing sources that can be used to synchronize timed loops with the delivery of synchronous messages.

Deterministic Network

The following describes in detail one embodiment of a deterministic network, also referred to herein as a time-triggered network or a closed network. The following embodiment is exemplary only.

A deterministic communication engine that offers deterministic communication functionality over Ethernet may be deployed on one of the nodes connected to the deterministic network which is designated the master node. The other nodes are designated as slaves. The master divides network bandwidth into cycles via a cycle packet that is sent in predetermined intervals. Time left in the cycle after the cycle start packet may be used by the application for data transfer. The engine distinguishes nodes via 6-character strings. The "*" string is also a valid node identifier and means broadcast, i.e., it denotes all nodes.

Users can exchange data in two ways: via a message-based abstraction referred to as a channel or slot-based abstraction or via a shared memory abstraction. The first approach is a serial, message-based approach and offers various buffering policies on both sides of the channel. The second approach offers random access to any location within shared memory block but offers no buffering. Neither approach guarantees data delivery since the underlying network must be deterministic.

A channel is characterized by an offset, length (equal to the maximum amount of data that can be sent via the channel in one cycle), and underlying physical network HW (each node may have more than one port used to form various networks operating in various modes). In other words, channel takes care of reserving resources on a network. In one embodiment it is the responsibility of the user to avoid collisions by making sure that channel transmission times do not overlap. The engine provides an entry point that takes a number of bytes to be transferred, network type (100/1000), adapter type (model), and target type as an input parameter and returns required time in us. The returned time can then be converted into a number of slots based on the desired slot length. The network, adapter, and target types are not required if the call is made at run time. In another embodiment a smart scheduler engine serves for allocation and policing of network bandwidth. The channel itself is not used to read/write data. Instead, a channel read or write terminal is created. The channel terminal configuration parameters include a sub-channel, read/write policy, sub-channel priority, and sub-channel destination (can be an individual node or a broadcast). The notion of a sub-channel allows one to use the same channel to selectively transfer data to different nodes in different cycles by configuring these nodes to listen to different sub-channels. In other words, destination address of a message is determined by a (destination 6-character string, channel, sub-channel) triplet and all sub-channels use the same channel to transfer data. Default destination of a message is obtained from its sub-channel destination unless it is explicitly overwritten in the write call. The sub-channel messages are sent based on their priorities. By default, a message inherits priority from its sub-channel unless explicitly overwritten in the write call. Within a priority level, FIFO scheduling is used. There can be only one read/write terminal per sub-channel and data written into a write terminal will also be sent to its matching read terminal if it exists. Read/Write policies may be used to configure terminals with different buffering algorithms. The length of a buffer is expressed in units of messages where each message may be up to maximum number of channel bytes in size. Channel data may be sent via more than one packet if the maximum amount of data to be sent per channel exceeds number of bytes that can be sent in a single packet.

Only one node has exclusive access to a channel even though any node is free to create write terminals. Writing to a terminal will result in an error if a node does not own a channel. The ownership is established at channel configuration time but it is up to user to make sure that initially there is only one owner. Owner may transfer ownership to any node at any point via a channel write call parameter.

To simplify development of user applications, the engine supports two channel-specific timing sources: "Data Arrived" timing source fires every time a packet is received on a read terminal; and "Data Sent" timing source fires every time packet is sent from a write terminal.

A memory block is characterized by a list of objects that reside at a fixed offset from the beginning of the block. Each objects has a 4-byte descriptor associated with it: type (7 bits), buffer flag (1 bit), and actual size (3 bytes). The type is used to distinguish between scalars or cluster of scalars, and arrays. The buffer flag is used to guarantee data consistency and make sure that particular piece of memory block is not constantly invalidated because its write access and memory reflections coincide. For each variable from the block twice as much memory is allocated and reflected. When write occurs, the writer checks the flag, copies data into the free buffer and then updates the flag. If memory reflection occurs before the flag is updated, readers use previously written data. Actual total size corresponds to the number of valid bytes in the reflected data. This allows writers to write partially filled arrays. The memory block uses channel abstraction underneath to scheduler update periods. There are two timing sources related to memory block abstraction. One fires once a particular node finished reflection and the second fires once the last reflection in the cycle has been completed.

"Network us Timing Source" is a microsecond timing source synchronized to the network time and may be used to perform synchronous activities on all nodes belonging to the same network.

The engine resides in a single dll. The API is supported only on targets that offer two Ethernet ports: one for non-deterministic data exchange (referred to as "public") and one for deterministic data exchange (referred to as "private"). Non-RT targets can only create read terminals because the engine shares CPU with user application and therefore must run on a real-time OS if collisions are to be avoided.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible memory medium that stores program instructions for communicating data between a first computer and a second computer over a network, wherein the program instructions are executable to implement:
   a first graphical program on the first computer system coupled to the network, wherein the first graphical program comprises a first plurality of interconnected nodes that visually represent functionality of the first graphical program, wherein the first plurality of interconnected nodes comprises a first variable node corresponding to a first variable, and wherein the first variable node comprises an icon that represents the first variable node in the graphical program, as well as underlying code or data that implements functionality of the first variable node;
   wherein during execution the first graphical program writes data to the first variable by providing the data as input to the first variable node and, thereby causing delivery of the data to the second computer system over the network in a time-deterministic manner, wherein the delivery of the data to the second computer system over the network in a time-deterministic manner comprises delivery of the data to the second computer system over the network within a specified time, wherein the data are received by a second variable node in a second graphical program executing on the second computer system coupled to the network, wherein the second graphical program comprises a second plurality of interconnected nodes that visually represent functionality of the second graphical program, wherein the second plurality of interconnected nodes comprises the second variable node, wherein the second variable node corresponds to the first variable, and wherein during execution the second graphical program reads from the first variable by reading the data as output from the second variable node.

2. The non-transitory computer-accessible memory medium of claim 1, wherein the first variable comprises a first deterministic shared variable, and wherein the program instructions are further executable to implement:
creating the first deterministic shared variable in response to user input; and
configuring a communication slot in a network cycle for the first deterministic shared variable;
wherein to deliver the data, the program instructions are executable to deliver the data written to the first variable to the second computer system over the network in a time-deterministic manner in the configured communication slot.

3. The non-transitory computer-accessible memory medium of claim 1, wherein the network comprises a deterministic network.

4. The non-transitory computer-accessible memory medium of claim 1,
wherein the first graphical program comprises a first iterative portion configured to write to the first variable node each iteration;
wherein the second graphical program comprises a second iterative portion configured to read from the second variable node each iteration; and
wherein each iteration of the second iterative portion of the second graphical program begins in response to receiving a value for the first variable over the network.

5. The non-transitory computer-accessible memory medium of claim 4,
wherein the first computer and the second computer have respective clocks, and wherein the clocks are synchronized.

6. The computer-accessible memory medium of claim 4,
wherein the first iterative portion is a first graphical loop structure; and
wherein the second iterative portion is a second graphical loop structure.

7. The non-transitory computer-accessible memory medium of claim 6,
wherein the first graphical loop structure and the second graphical loop structure are each configured to wake up upon receipt of the value by the first computer system.

8. A computer-implemented method for communicating data between a first computer and a second computer over a network, comprising:
utilizing the first computer to perform:
executing a first graphical program on the first computer system coupled to the network, wherein the first graphical program comprises a first plurality of interconnected nodes that visually represent functionality of the first graphical program, wherein the first plurality of interconnected nodes comprises a first variable node corresponding to a first variable, wherein the first variable node comprises an icon that represents the first variable node in the graphical program, as well as underlying code or data that implements functionality of the first variable node, and wherein said executing the first graphical program comprises:
the first graphical program writing to the first variable during execution by providing the data as input to the first variable node; and
in response to said providing, the first graphical program delivering the data to the second computer system over the network in a time-deterministic manner, wherein said delivering the data to the second computer system over the network in a time-deterministic manner comprises delivering the data to the second computer system over the network within a specified time, wherein the data are received by a second variable node in a second graphical program executing on the second computer system coupled to the network, wherein the second graphical program comprises a second plurality of interconnected nodes that visually represent functionality of the second graphical program, wherein the second plurality of interconnected nodes comprises the second variable node, wherein the second variable node corresponds to the first variable, and wherein during execution the second graphical program reads from the first variable by reading the data as output from the second variable node.

9. A non-transitory computer-accessible memory medium that stores program instructions for communicating data between a first computer and a second computer over a network, wherein the program instructions are executable to implement:
executing a first graphical program on the first computer system coupled to the network, wherein the first graphical program comprises a first plurality of interconnected nodes that visually represent functionality of the first graphical program, wherein the first plurality of interconnected nodes comprises a first variable node corresponding to a first variable, wherein the first variable node comprises an icon that represents the first variable node in the graphical program, as well as underlying code or data that implements functionality of the first variable node, and wherein said executing the first graphical program comprises the first graphical program writing to the first variable during execution by providing the data as input to the first variable node; and
in response to said providing, the first graphical program delivering the data written to the first variable to the second computer system over the network in a time-deterministic manner, wherein said delivering the data written to the first variable to the second computer system over the network in a time-deterministic manner comprises delivering the data written to the first variable to the second computer system over the network within a specified time, wherein the data are useable by a second graphical program executing on the second computer system coupled to the network, wherein the second graphical program comprises a second plurality of interconnected nodes that visually represent functionality of the second graphical program, and wherein the second plurality of interconnected nodes comprises a second variable node corresponding to the first variable, and wherein said second graphical program is executable to read from the first variable by reading the data as output from the second variable node.

10. The non-transitory computer-accessible memory medium of claim 9, wherein the first variable comprises a first deterministic shared variable, and wherein the program instructions are further executable to implement:

creating the first deterministic shared variable in response to user input; and configuring a communication slot in a network cycle for the first deterministic shared variable;

wherein to deliver the data, the program instructions are executable to deliver the data written to the first variable to the second computer system over the network in a time-deterministic manner in the configured communication slot.

11. The non-transitory computer-accessible memory medium of claim 9, wherein the network comprises a deterministic network.

12. The non-transitory computer-accessible memory medium of claim 9, wherein the first graphical program comprises a first iterative portion configured to write to the first variable node each iteration;

wherein the second graphical program comprises a second iterative portion configured to read from the second variable node each iteration; and wherein each iteration of the second iterative portion of the second graphical program begins in response to receiving a value for the first variable over the network.

13. The non-transitory computer-accessible memory medium of claim 12, wherein the first computer and the second computer have respective clocks, and wherein the clocks are synchronized.

14. The non-transitory computer-accessible memory medium of claim 12, wherein the first iterative portion is a first graphical loop structure; and wherein the second iterative portion is a second graphical loop structure.

15. The non-transitory computer-accessible memory medium of claim 14, wherein the first graphical loop structure and the second graphical loop structure are each configured to wake up upon receipt of the value by the first computer system.

16. A computer-implemented method for communicating data between a first computer and a second computer over a network, comprising: utilizing the first computer to perform:

executing a first graphical program on the first computer system coupled to the network, wherein the first graphical program comprises a first plurality of interconnected nodes that visually represent functionality of the first graphical program, wherein the first plurality of interconnected nodes comprises a first variable node corresponding to a first variable, wherein the first variable node comprises an icon that represents the first variable node in the graphical program, as well as underlying code or data that implements functionality of the first variable node, and wherein said executing the first graphical program comprises the first graphical program writing to the first variable during execution by providing the data as input to the first variable node; and in response to said providing, the first graphical program delivering the data written to the first variable to the second computer system over the network in a time-deterministic manner, wherein said delivering the data written to the first variable to the second computer system over the network in a time-deterministic manner comprises delivering the data written to the first variable to the second computer system over the network within a specified time, wherein the data are useable by a second graphical program executing on the second computer system coupled to the network, wherein the second graphical program comprises a second plurality of interconnected nodes that visually represent functionality of the second graphical program, and wherein the second plurality of interconnected nodes comprises a second variable node corresponding to the first variable, and wherein said second graphical program is executable to read from the first variable by reading the data as output from the second variable node.

17. The computer-implemented method of claim 16, wherein the second graphical program comprises a second plurality of interconnected nodes that visually represent functionality of the second graphical program, wherein the second plurality of interconnected nodes comprises the second variable node, wherein the second variable node corresponds to the first variable, and wherein during execution the second graphical program reads from the first variable by reading the data as output from the second variable node.

* * * * *